(12) United States Patent
Behforooz et al.

(10) Patent No.: US 8,407,311 B1
(45) Date of Patent: Mar. 26, 2013

(54) SYSTEM AND METHOD FOR CREATING RELATIONSHIPS AMONG USERS OF AN INSTANT MESSAGING SERVICE

(75) Inventors: Reza Behforooz, Seattle, WA (US); Jonas Erik Lindberg, Seattle, WA (US); Roderick Adonis Chavez, Bellevue, WA (US); Gary S Burd, Kirkland, WA (US)

(73) Assignee: Google Inc., Mountain View, CA (US)

( * ) Notice: Subject to any disclaimer, the term of this patent is extended or adjusted under 35 U.S.C. 154(b) by 604 days.

(21) Appl. No.: 12/050,073

(22) Filed: Mar. 17, 2008

(51) Int. Cl.
*G06F 15/16* (2006.01)

(52) U.S. Cl. .......................... 709/217; 709/218; 709/227

(58) Field of Classification Search .................. 709/217, 709/218, 227
See application file for complete search history.

(56) References Cited

U.S. PATENT DOCUMENTS

| | | | |
|---|---|---|---|
| 6,301,609 B1 | 10/2001 | Aravamudan et al. | 709/207 |
| 6,404,884 B1 | 6/2002 | Marwell et al. | 379/265.13 |
| 6,430,602 B1 | 8/2002 | Kav et al. | 709/206 |
| 7,069,308 B2 | 6/2006 | Abrams | 709/218 |
| 7,099,862 B2 * | 8/2006 | Fitzpatrick et al. | 707/758 |
| 7,266,583 B2 * | 9/2007 | Fitzpatrick et al. | 709/205 |
| 7,404,007 B2 | 7/2008 | Wilcock et al. | 709/238 |
| 7,596,597 B2 * | 9/2009 | Liu et al. | 709/204 |
| 7,623,650 B2 | 11/2009 | Dalton et al. | 379/265.01 |
| 7,685,236 B1 | 3/2010 | Harik et al. | 709/205 |
| 7,945,862 B2 * | 5/2011 | Aldrich et al. | 715/751 |
| 2002/0023132 A1 | 2/2002 | Tornabene et al. | 709/205 |
| 2002/0198008 A1 | 12/2002 | Smith et al. | 455/466 |
| 2004/0128322 A1 * | 7/2004 | Nagy | 707/104.1 |
| 2004/0186887 A1 | 9/2004 | Galli et al. | 709/206 |
| 2005/0165893 A1 * | 7/2005 | Feinberg et al. | 709/205 |
| 2007/0078938 A1 * | 4/2007 | Hu et al. | 709/206 |

* cited by examiner

*Primary Examiner* — Yasin Barqadle
*Assistant Examiner* — Van Kim T Nguyen
(74) *Attorney, Agent, or Firm* — Morgan, Lewis & Bockius LLP

(57) ABSTRACT

A computer-implemented method of introducing users of a service includes sending a suggestion to a first user of a service and suggesting an introduction of a second user to a third user of the service. The second and third users are both identified as contacts of the first user in a contact list of the first user and the second and third users satisfy predefined selection criteria with respect to shared contacts, comprising users identified in contact lists of both the second and third users. The method also includes receiving, from the first user, a response to the suggestion; and upon receiving a positive response to the suggestion from the first user, sending the introduction to at least one of the second and third users.

25 Claims, 18 Drawing Sheets

The disclosed embodiments relate generally to electronic
SYSTEM AND METHOD FOR CREATING RELATIONSHIPS AMONG USERS OF AN INSTANT MESSAGING SERVICE

TECHNICAL FIELD

The disclosed embodiments relate generally to electronic messaging applications. More particularly, the disclosed embodiments relate to creating relationships among users of an instant messaging service.

BACKGROUND

Instant messaging (also known as "IM") is becoming a popular form of online communication. Several IM client applications are currently available. Examples of IM clients include AOL Instant Messenger ("AIM"), Yahoo Messenger, MSN Messenger, ICQ, GAIM, and Trillian. Through IM, a user can communicate, in real time, with other users that are in her list of IM contacts.

However, it is difficult, and perhaps nearly impossible, for a user to know what other users (e.g., users not in her list of IM contacts) are present in the online community or instant messaging services without contacting those users directly. Accordingly, it is highly desirable to provide a system to assist in creating relationships among users of such instant messaging services.

SUMMARY OF EMBODIMENTS

In accordance with some embodiments, a computer-implemented method of introducing users of a service includes sending a suggestion to a first user of a service and suggesting an introduction of a second user to a third user of the service. The service typically treats the contact list of each user as being private to that user. The second and third users are both identified as contacts of the first user in a contact list of the first user, and furthermore the second and third users satisfy predefined selection criteria with respect to shared contacts, which are users identified in contact lists of both the second and third users. The method also includes receiving, from the first user, a response to the suggestion; and upon receiving a positive response to the suggestion from the first user, sending the introduction to at least one of the second and third users.

In accordance with some embodiments, a computer-implemented method of identifying pairs of users to introduce includes accessing contact lists of multiple users of a service, and identifying, from the accessed contact lists, pairs of users who are not in each other's contact lists but who have common contacts in their contact lists. Each identified pair of users includes respective first and second users. The method also includes generating a score for each identified pair of users, selecting a subset of the identified pairs of users in accordance with selection criteria and identifying a potential sponsor for each pair of users in the selected subset. The score is determined at least in part on metrics associated with the common contacts of the pair of users, and the potential sponsor is a user of the service. The method further includes, with respect to a pair of users in the selected subset, sending a suggestion to the potential sponsor, suggesting an introduction of the respective first and second users of the pair of users, and upon receiving a positive response to the suggestion from the potential sponsor, sending the introduction to at least one of the first and second users of the pair of users.

In accordance with some embodiments, a computer system includes memory for storing programs and data, including contact lists of multiple users of a service and one or more programs, and one or more processors. The one or more programs include instructions executable by the one or more processors and include instructions for: sending a suggestion to a first user of the service, suggesting an introduction of a second user to a third user of the service, receiving from the first user a response to the suggestion; and sending the introduction to at least one of the second and third users upon receiving a positive response to the suggestion from the first user. The second and third users are both identified as contacts of the first user in a contact list of the first user and satisfy predefined selection criteria with respect to shared contacts, comprising users identified in contact lists of both the second and third users.

In accordance with some embodiments, a computer system includes memory for storing programs and data, including contact lists of multiple users of a service and one or more programs, and one or more processors. The one or more programs are executable by the one or more processors and include instructions for: accessing contact lists of multiple users of a service; identifying, from the accessed contact lists, pairs of users who are not in each others' contact lists but who have common contacts in their contact lists; each identified pair of users having respective first and second users; generating a score for each identified pair of users; selecting a subset of the identified pairs of users in accordance with selection criteria; identifying a potential sponsor for each pair of users in the selected subset; sending a suggestion to the identified potential sponsor of a respective pair of users in the selected subset, suggesting an introduction of the respective first and second users of the pair of users; and receiving from the potential sponsor a response to the suggestion; and sending the introduction to at least one of the first and second users of the pair of users upon receiving from the potential sponsor a positive response to the suggestion. The score is determined at least in part on metrics associated with the common contacts of the pair or users, and the potential sponsor is a user of the service.

BRIEF DESCRIPTION OF THE DRAWINGS

Like reference numerals refer to corresponding parts throughout the drawings.

DESCRIPTION OF EMBODIMENTS

Figure 1A:
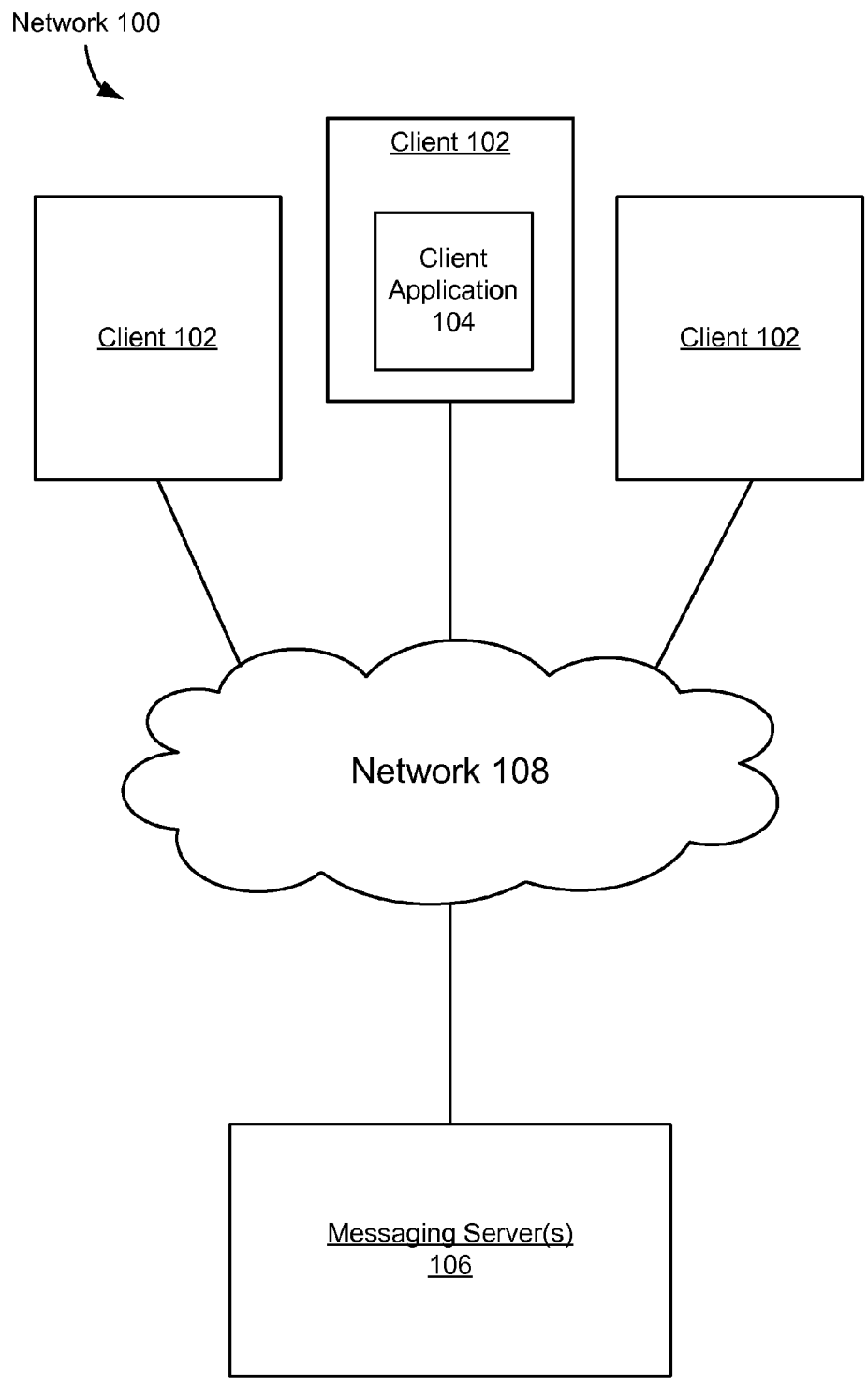
FIGS. 1A and 1B are block diagrams illustrating networks, according to some embodiments of the invention.
Figure 1B:
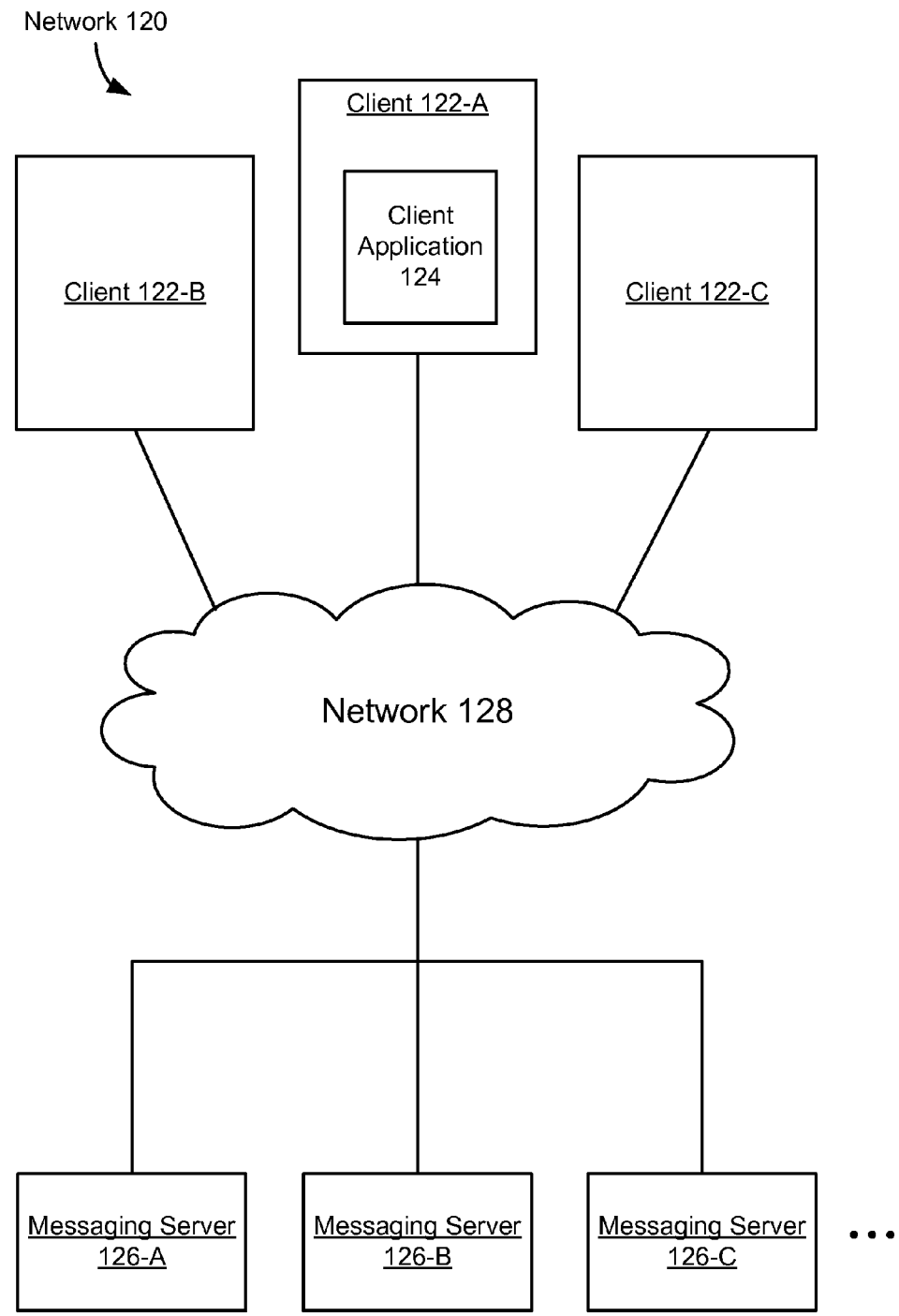

FIGS. 1A and 1B are block diagrams illustrating networks, according to some embodiments of the invention. In FIG. 1A, the network 100 includes one or more clients 102, one or more messaging servers 106, and one or more networks 108 that couple these components. The client 102 may be any communications device or computer, including but not limited to, desktop computers, laptop computers, personal digital assistants (PDAs), mobile phones, network terminals, and so forth. The network(s) 108 may include, without limitation, local area networks (LAN), wide area networks (WAN), wired or wireless networks, mobile phone networks, the Internet, or any suitable combination of such networks.

The client 102 includes a client application 104. The client application 104 may be any program, module, instructions, or the like, that sends and receives documents between clients 102. A document may be any type of machine-readable data, which may include any combination of text, graphics, video, audio, etc. In some embodiments, the client application 104 is a communication application, such as a messaging application, and the documents are messages. Examples of messages include, without limitation, email messages and instant messaging messages. Examples of messaging applications include, without limitation, email applications and instant messaging applications (which may include IM applications on a computer or PDA or the like, and short message service (SMS) applications on mobile telephones). For convenience of explanation, the description below will describe the clients and messaging servers 106 as sending and receiving messages. Alternately, the client application may be a communication application such as a telephone or VoIP (voice over IP) application for handling telephone or audio communications.

One or more messaging servers 106 provide messaging services to clients 102. The messaging servers 106 store information associated with the users of the service, user status information, and address books of users, further details of which are described below, in relation to FIGS. 10A-10B. In some embodiments, the messaging servers 106 store and relay messages to and from clients 102. In some other embodiments, the messaging servers 106 provide information to be used by a client to directly connect to another client. The messaging servers 106 and clients 102 may utilize any of a plurality of messaging protocols, including but not limited to Simple Mail Transfer Protocol (SMTP), Post Office Protocol version 3 (POP3), Internet Relay Chat (IRC), OSCAR, JABBER, etc.

In some embodiments, the messaging servers 106 monitor and manage the status information of the users of the messaging service. Whenever a client application associated with a user of the messaging service is not running on a client or is running but is otherwise not in communication with the messaging servers 106, the user is considered to be offline. If the client application is running and is in communication with the messaging servers 106, the user is considered to be online. Whenever a user goes from offline to online, the client application 104 sends a message to the messaging servers 106 announcing the change in status. The messaging servers 106 update the status information associated with the user to reflect the status change. The messaging servers 106 may forward the status of a user A to a client application associated with a user B who is interested in the status of user A. In some embodiments, the status of user A is forwarded to user B and other users by a broadcast or multicast message.

The status information monitored by the messaging servers 106 may be further refined. One or more predefined statuses may be provided and serve as a default set of statuses. One or more status messages, which are text strings that describe the status in further detail, may be associated with the predefined statuses. A user's online status may be set to any one of the predefined statuses by user intervention or as an automatic response to particular events. The predefined statuses serve to indicate in greater detail the user's willingness and/or availability to exchange messages with other users.

In some embodiments, the predefined user statuses may include "active," "idle," "busy," "chatty," and offline. "Active" means that the user is available to send and/or receive messages. "Idle" (or "away") means that the user has not been actively using the client for at least a specified amount of time, and by implication, is away from the client. "Busy" means that the user is preoccupied with other matters and is not available for sending and/or receiving messages. "Chatty" means that the user is actively sending and/or receiving messages and may be willing to send and/or receive more. "Offline" means that the user is offline, as described above. A user that is "active," "idle," "busy," or "chatty" is also online because the client application 104 is running and in communication with the messaging servers 106.

It should be appreciated that the statuses described above are merely exemplary. Additional and/or alternative statuses may also be used.

In some embodiments, a user may also define custom statuses and/or custom status messages. For example, a user may define a custom status message saying that she is "on vacation."

The messaging servers 106 may also store, for each user of the messaging service, an address book (or a buddy list, contact list, or the like). The address book is a roster of one or more contacts associated with the user. A contact is typically a person with whom the user has previously communicated (by email, voice, IM, and so on) or with whom the user may wish to choose to communicate. While some contacts may be entities such as companies, or serve a particular function (e.g., warranty service) of an entity, the present discussion primarily concerns human contacts listed in the address book or contact list of one or more users. The address book associates contacts with one or more communication addresses or locators (email address, IM address, phone number, and so on) as well as other information such as a name or profile. A contact may or may not participate in the same IM network as the user and therefore may or may not be reachable over IM.

In some embodiments, particular messaging servers may be assigned to monitor and store the status information and address books of a particular subset of users. An example of this configuration is illustrated in FIG. 1B. In FIG. 1B, the network 120 includes clients 122-A, 122-B, and 122-C, each associated with a different user. Each client may include one or more client applications 124. The network 120 also includes messaging servers 126-A, 126-B, and 126-C, and a network 128 that couples these components.

Each messaging server 126-A, 126-B, 126-C is assigned a subset of users. For example, messaging server 126-A is assigned the user of client 122-A, messaging server 126-B is assigned the user of client 122-B, and messaging server 126-C is assigned the user of client 122-C. Whenever a user's online status changes, the client application associated with that user sends a message informing its corresponding messaging server of its status change. The messaging server receives that message, updates the status of the user, and forwards the new status to other interested messaging servers.

Figure 1C:
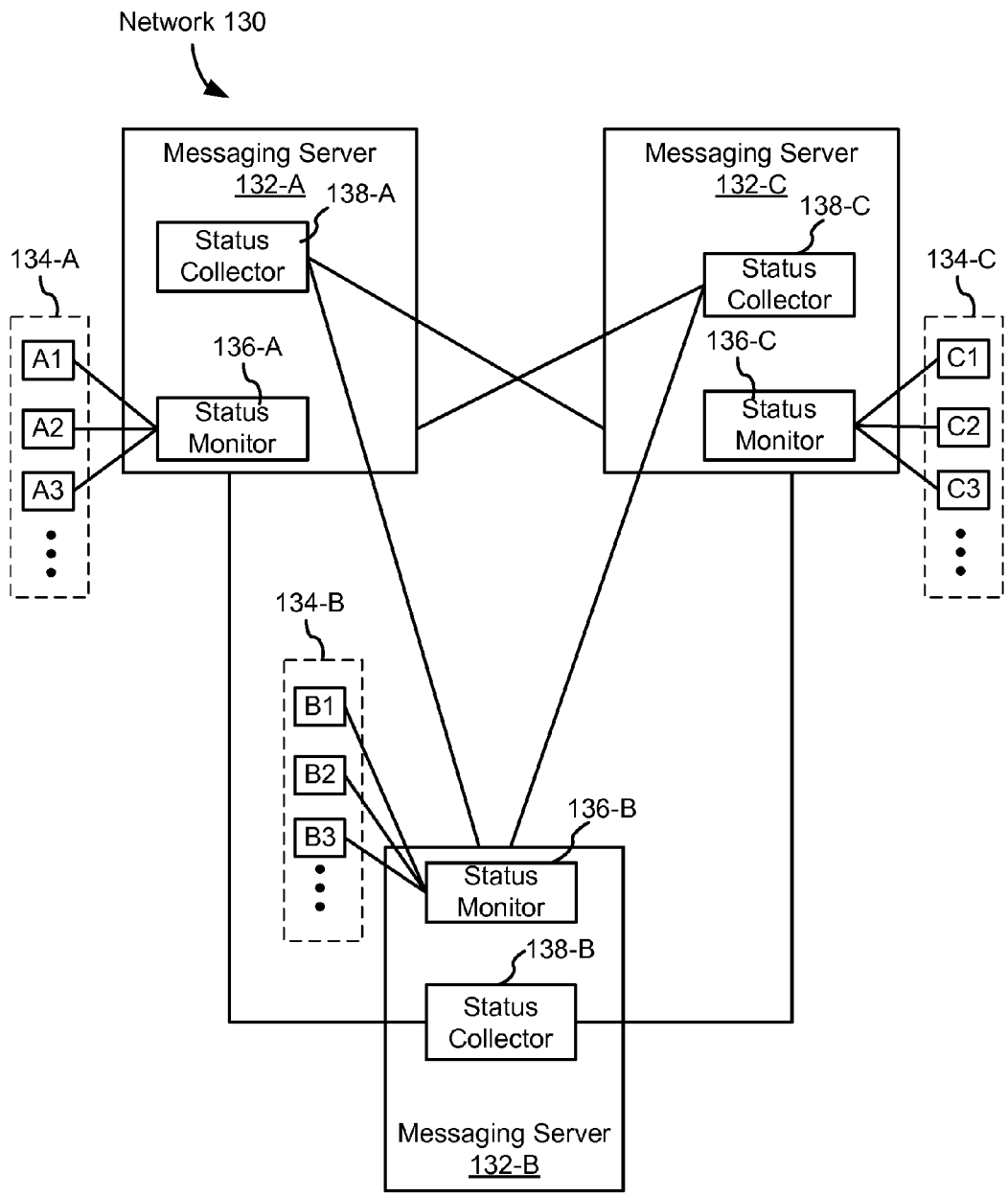
FIG. 1C is a block diagram illustrating a network of messaging servers, according to some embodiments of the invention.

FIG. 1C is a block diagram illustrating a network of messaging servers, according to some embodiments of the invention. FIG. 1C illustrates an embodiment of a logical coupling of the messaging servers to each other and to clients for monitoring and reporting the statuses of the users on the clients. The network 130 includes messaging servers 132-A, 132-B, and 132-C. The network 130 may include more or fewer messaging servers 132 than what is shown in FIG. 1C. Each messaging server is assigned a set of one or more users. Messaging server 132-A is assigned users 134-A. Messaging server 132-B is assigned users 134-B. Messaging server 132-C is assigned users 134-C. Each messaging server includes a status monitor and a status collector. Thus, messaging server 132-A includes a status monitor 136-A and a status collector 138-A. Messaging server 132-B includes a status monitor 136-B and a status collector 138-B, and messaging server 132-C includes a status monitor 136-C and a status collector 138-C. In some other embodiments, each of the messaging servers 132 has one status monitor and one status collector per user that is assigned to the respective messaging server.

Whenever a user goes from offline to online (e.g., by logging in at the client application), the client application sends a message to the network 130 announcing that it is online. In some embodiments, this message is routed to the messaging server assigned to the user, and the other messaging servers will not receive this message directly because it came from a user not assigned to them. The status monitor at the messaging server to which the user is assigned receives the message and changes the status of that user to "online" (or "active," "busy," or whatever status is appropriate). Furthermore, the status collector at the messaging server gathers the statuses of the contacts in that user's address book. While some of the contacts in the user's address book may be assigned to the same message server, other contacts in the user's address book are assigned to other message servers. The status collector assigned to the user gathers the statuses of the user's contacts, including those assigned to other messaging servers, and forwards at least a portion of the collected status information to the user. In some embodiments, the status collector broadcasts requests for status information of the contacts to the network and the messaging servers to which the contacts are assigned respond to the requests. In some other embodiments, the status collector determines the messaging servers to which the contacts are assigned and sends requests for status information to those messaging servers. In some embodiments, the contact assignments may be determined by reference to an index of all users, a copy of which may be stored in all of the messaging servers or a subset thereof, and their messaging server assignments.

For example, if a user A1 of users 134-A, assigned to messaging server 132-A, goes from offline to online, the client application associated with the user A1 sends a message to the network 130 announcing that user A1 is online. The status monitor 136-A at the messaging server 132-A receives the message (the other messaging servers 132-B and 132-C will not receive it) and updates the status of the user A1 to online. The status collector 138-A at the messaging server 132-A obtains a list of the contacts in the user A1's address book, for instance by accessing user A1's address book. Using that list of contacts, the status collector 138-A gathers status information from the messaging servers to which the contacts are assigned. Thus, if a contact is assigned to messaging server 132-A, then the status collector 138-A accesses the contact's status information stored at messaging server 132-A. If the contact is assigned to messaging server 132-B, then it communicates with messaging server 132-B to get the status information. A similar procedure occurs if the contact is assigned to messaging server 132-C.

In the embodiments described here, the contact list of each user is maintained as private. Information derived from a user's contact list is used to send an introduction only with the explicit permission of one of the users from whose contact list the information was derived. In addition, in some embodiments, when a sponsor (first user) sends an introduction suggestion to a second user concerning a third user, the sponsor is authorized (by the second and third users, explicitly or implicitly) to receive online status information of the second and third users. From a different perspective, in these embodiments a user can be a sponsor for introducing the second and third users only if the sponsor is already authorized to receive online status information for the second and third users. Thus, the sponsor receives online status information about the second and third users, and the second and third users each receive online status information about the sponsor (first user).

Figure 2:
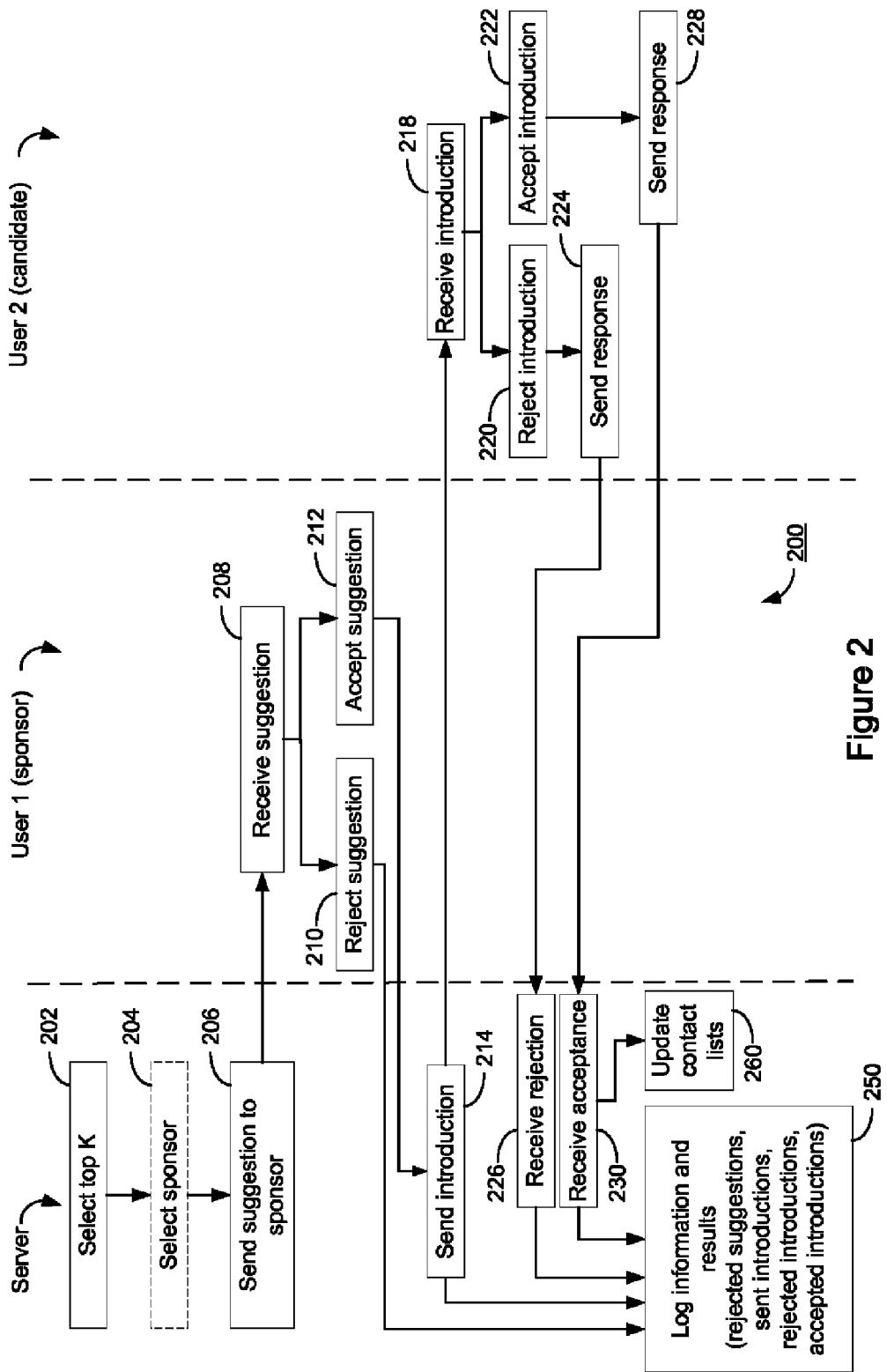
FIG. 2 is a flow diagram illustrating a process for introducing users of an online application, according to some embodiments of the invention.

FIG. 2 is a flow diagram illustrating a process for introducing users of an online application, according to some embodiments of the invention. In some embodiments, the process 200 begins at a server where the top K entries (each entry representing or indicating a pair of users) are selected based on certain criteria (202). In some embodiments, a sponsor is selected (204) and a suggestion is sent to that sponsor (206). The sponsor (also known as user 1) receives the suggestion to introduce a candidate (also know as user 2) to another user 3 (208). The sponsor then has the option to reject the suggestion (210) or accept the suggestion (212). If the sponsor rejects the suggestion, a message is sent back to the server and the server logs the information and result (250). If the sponsor accepts the suggestion (212), a message is sent to the server, which sends an introduction (214) to the candidate. The server also logs the information related to the sent introduction (250). When the candidate receives the introduction (218), the candidate may accept the introduction (222) or reject the introduction (220). If the candidate rejections the introduction, a response (decline introduction) is sent to the server (224), which receives the rejection (226) and logs the information and results (250). If the candidate accepts the introduction (222), a response (acceptance introduction) is sent to the server (228), which receives the acceptance (230) and logs the information and results (250) and also updates the contact lists (260) of the candidate and the other user 3. In some embodiments, the introduction is sent to both users, user 2 (the candidate) and user 3 (the other user), and only if both users accept the introduction are the contact lists of both users updated so as to allow each of these users to receive the online status information of the other. In yet other embodiments, if the candidate accepts the introduction (222), the system responds to that acceptance by sending an invitation from the candidate to the other user 3 to add each other to their respective contact lists as friends. Only when the other user 3 accepts the invitation are the contact lists of both the candidate and other user 3 updated to authorize both users to receive the online status information of the other. Online status information is sometimes called presence information or online presence information.

Figure 10A:
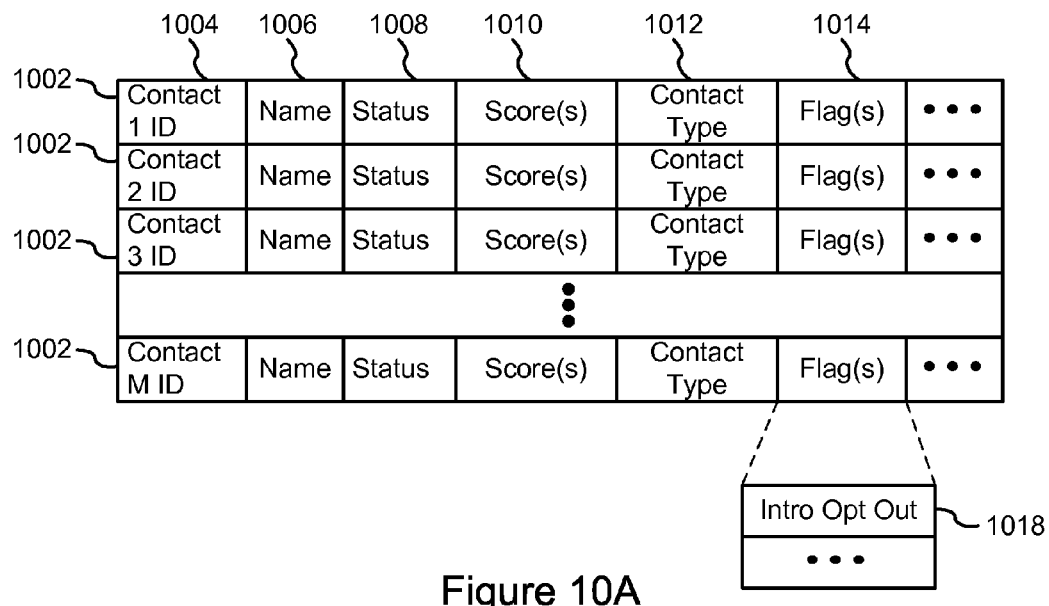
FIGS. 10A and 10B illustrate data structures residing in a client, according to some embodiments of the invention.
Figure 10B:
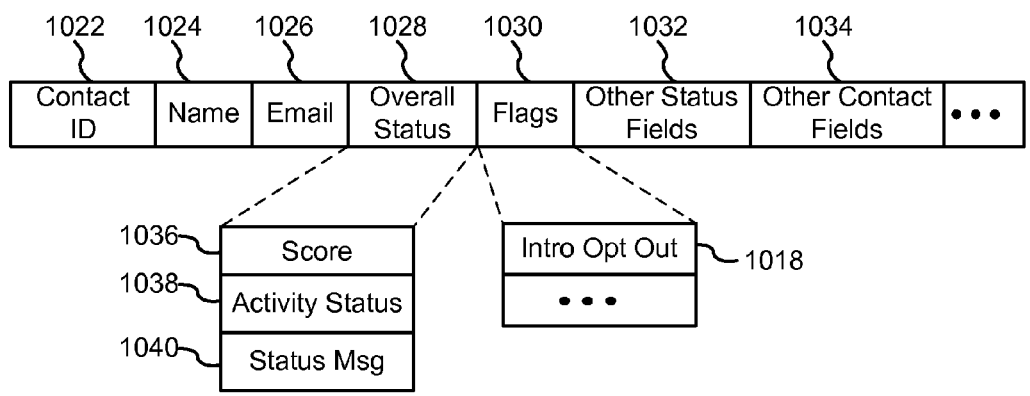

FIGS. 10A and 10B illustrate data structures residing in a client, according to some embodiments of the invention. The client may store one or more contact records 1002. The contact records that are stored at the client correspond to the contacts in the address book (at the messaging server) of the user of the client. In other words, whatever contacts are in the user's address book at the messaging server, data for those contacts may also be stored at the client as well. In some embodiments, the client replicates the contact information (e.g., contact records) stored for the user at a messaging server. In some other embodiments, the client replicates a subset of the contact information stored for the user at a messaging server.

In FIG. 10A, a contact record 1002 includes the user ID of the contact 1004, a name of the contact 1006, status information 1008 (e.g., online status), one or more scores 1010 (scores are discussed in more detail below), a contact type 1012, and one or more flags 1014. The user ID 1004, name 1006, status information 1008, score(s) 1010, and contact type 1012 are replicated from the messaging servers. The one or more flags 1014 indicate one or more states associated with the contact. In some embodiments, the flags 1014 may include an "introductions opt out" flag 1018 indicating that the user has opted out from sending and receiving introductions to other users.

In some embodiments, the contact type 1012 or one of the flags 1014 indicates whether or not the user whose address book contains the contact record 1002 is authorized to receive the online status information of the user corresponding to the contact record 1002. Alternately, the contact type 1012 or one of the flags 1014 indicates whether the user corresponding to the contact record 1002 is authorized to receive online status information of the address book owner. In such embodiments, a contact record in the address book of the other user will indicate whether "this user" (the one whose address book is shown in FIG. 10A) is authorized to receive online status information of the other user. In either type of embodiment, a user's address book may contain some entries for people for whom the user is not authorized to receive online status information and other entries for people for whom the user is authorized to receive online status information.

FIG. 10B illustrates an alternative embodiment of a contact record 1002 stored at the client. The contact record includes the user ID of the contact 1022, a name of the contact 1024, an email address 1026 of the contact, an overall status 1028, one or more flags 1030, other status fields 1032, and other contact fields 1034. The user ID, name, email address and overall status are automatically replicated from the message servers for all contacts in the user's address book. Other fields, such as the other status fields 1032 and other contact fields 1034, are replicated at the client for specific contacts when those fields are needed (e.g., the other contact fields 1034 are needed when the user requests to open a contact record in the user's address book).

In some embodiments, the overall status 1028 includes a score 1036, an activity status 1038, and a status message 1040. The one or more flags 1030 indicate one or more states associated with the contact. In some embodiments, the flags 1030 may include a flag indicating "opt out" information 1018.

Figure 3A:
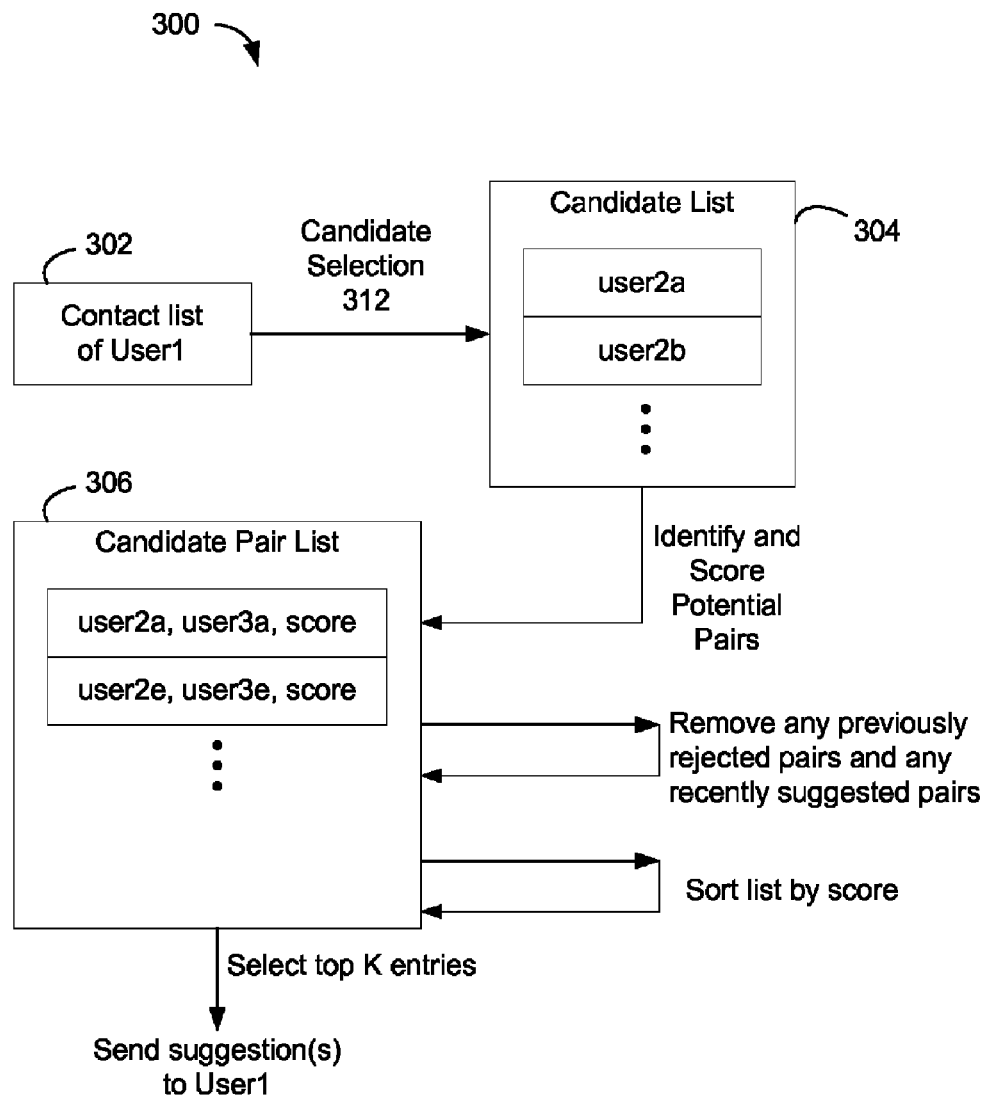
FIGS. 3A and 3B are flow diagram illustrating a process for sending suggestions to users, according to some embodiments of the invention.
Figure 3B:
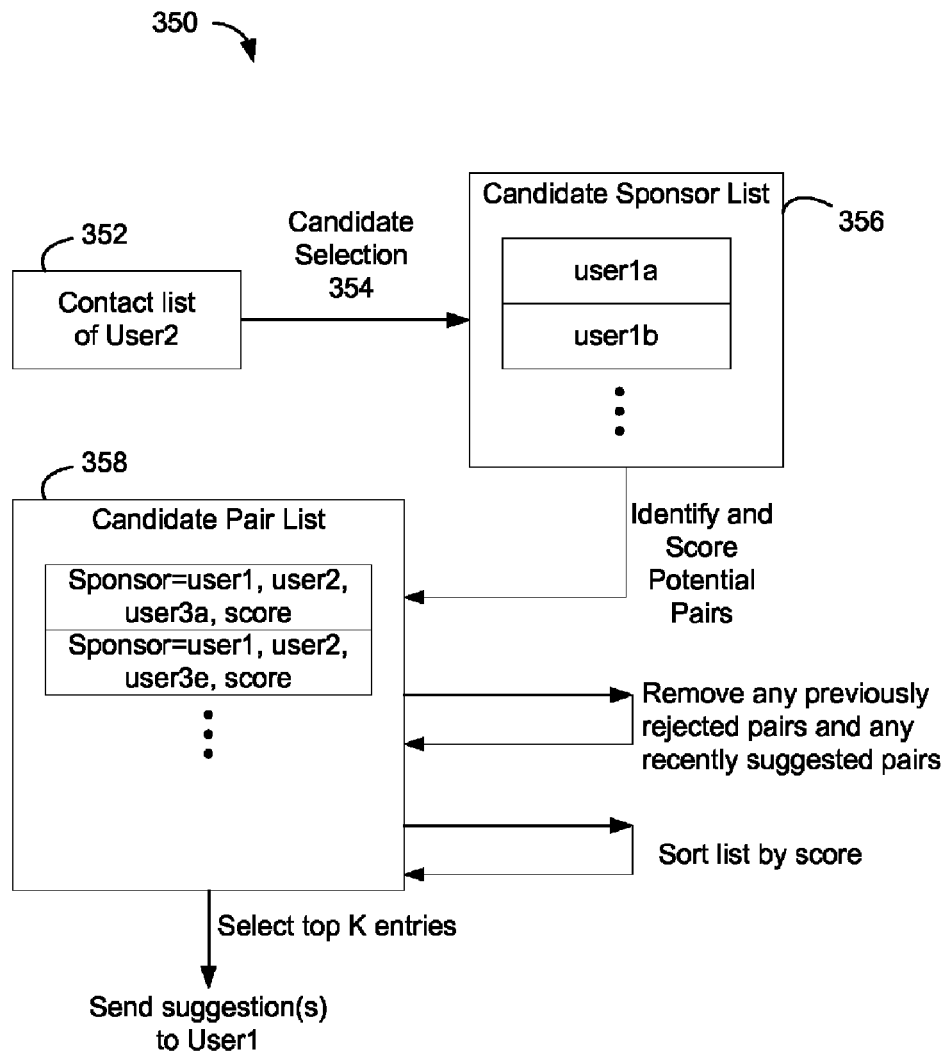

FIGS. 3A and 3B are flow diagrams illustrating a process for sending suggestions to users, according to some embodiments of the invention. In FIG. 3A, process 300 begins when a contact list of a chosen user (User1) is identified and examined (302). In some embodiments, the identified contact list includes all contacts in the user's address book. However, in some embodiments, the identified contact list may exclude some of the entries in the user's address book, such as entries that are not associated with people and/or entries associated with users who have opted out of sending and receiving introductions to other users. Candidate selection is performed (312), wherein a Candidate List is created (304). The process of creating the Candidate List is described in more detail below in the description of FIG. 5A. Potential pairs are identified and scored, and a Candidate Pair List is created (306). Details of this process are further described in the description of FIG. 5B. After the Candidate Pair List is created, previously rejected pairs and recently suggested pairs are removed from the Candidate Pair List. Alternately, previously rejected pairs are removed from the Candidate Pair List only if the previous rejection happened within a predefined amount of time (e.g., in the last M days or W weeks). The Candidate Pair List is then sorted by score. The top K entries (each entry representing or indicating a pair of users) are selected and a suggestion is sent to User1. Alternately, more than one suggestion may be sent to User1.

FIG. 3B is a flow diagram illustrating a process for sending suggestions to users, according to another embodiment of the invention. The contact list of User2 is identified and examined (352). In some embodiments, the identified contact list includes all contacts in the user's address book, or a subset of the contact (as discussed above). Candidate selection is performed (354), and a Candidate Sponsor List is created (356). The process of creating the Candidate Sponsor List 600B is described in more detail below in the description of FIG. 6A. Potential pairs are identified and scored, and a Candidate Pair List is created (356). Details of this process is further described in the description of FIG. 6B. After the Candidate Pair List is created, previously rejected pairs and recently rejected pairs are removed from the Candidate Pair List. The Candidate Pair List is then sorted by score. The top K entries are selected and a suggestion is sent to User1.

Figure 4:
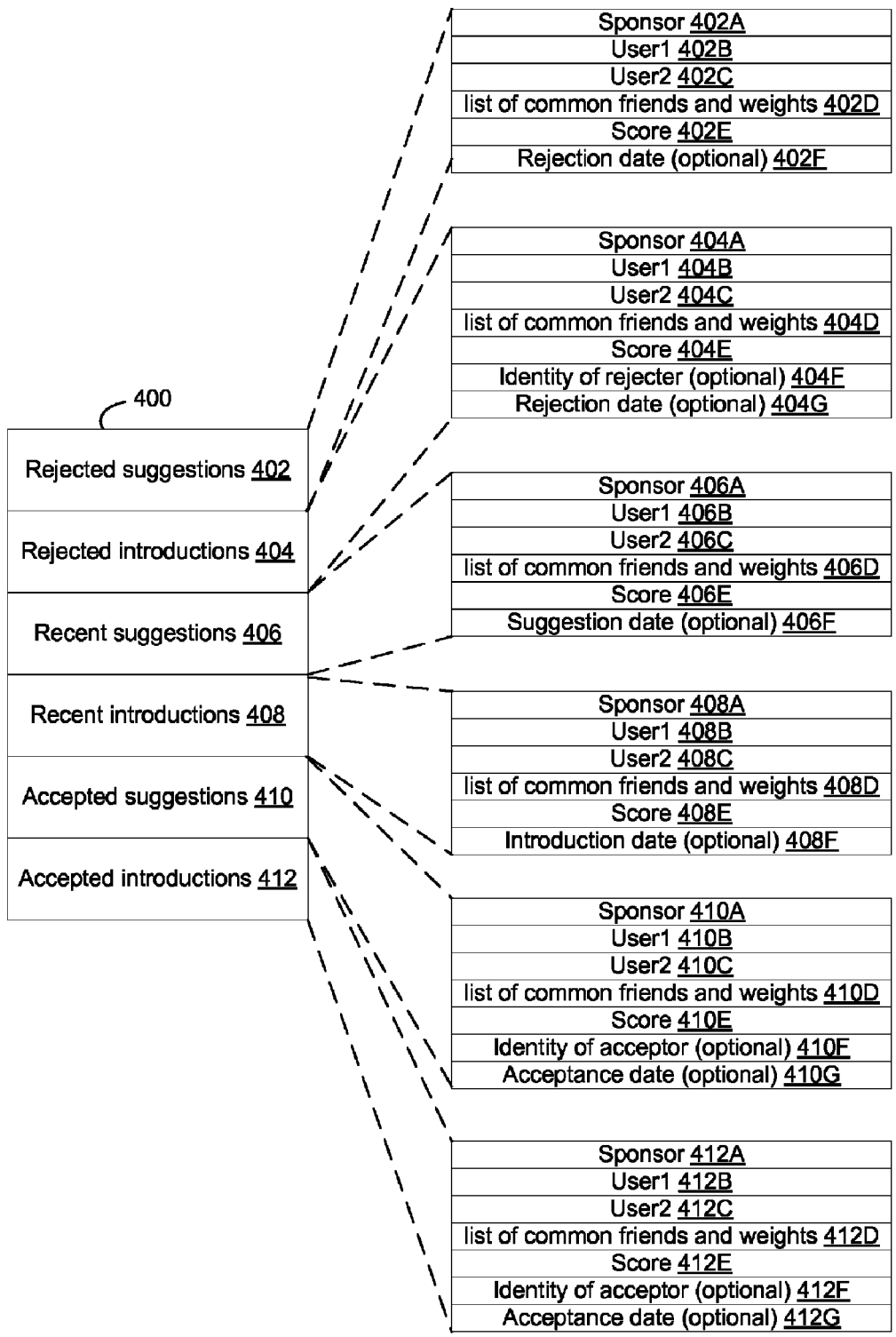
FIG. 4 illustrates a table of the type of information that is logged, according to some embodiments of the invention.

FIG. 4 illustrates a table 400 of the type of information that is logged, according to some embodiments of the invention. The table 400 typically includes the following, or a subset or superset thereof:
- rejected suggestions 402, which further includes associated information regarding sponsor 402A, user1 402B, user2 402C, list of common friends and weights 402D. score 402E, and optionally, rejection date 402F;
- rejected introductions 404, which further includes associated information regarding sponsor 404A, user1 404B, user2 404C, list of common friends and weights 404D. score 404E, and optionally, identity of the rejector 404F and rejection date 404G;
- recent suggestions 406, which further includes associated information regarding sponsor 406A, user1 406B, user2 406C, list of common friends and weights 406D. score 406E, and optionally, suggestion date 406F;
- recent introductions 408, which further includes associated information regarding sponsor 408A, user1 408B, user2 408C, list of common friends and weights 408D. score 408E, and optionally, introduction date 408F;
- accepted suggestions 410, which further includes associated information regarding sponsor 410A, user1 410B, user2 410C, list of common friends and weights 410D. score 410E, and optionally, identity of the acceptor 410F and acceptance date 410G; and
- accepted introductions 412, which further includes associated information regarding sponsor 412A, user1 412B, user2 412C, list of common friends and weights 412D. score 412E, and optionally, identity of the acceptor 412F and acceptance date 412G.

In other embodiments, additional information may be stored regarding the various suggestion and introduction events. Alternately, or in addition, one or more of the types of information listed above may be omitted in some embodiments.

Figure 5A:
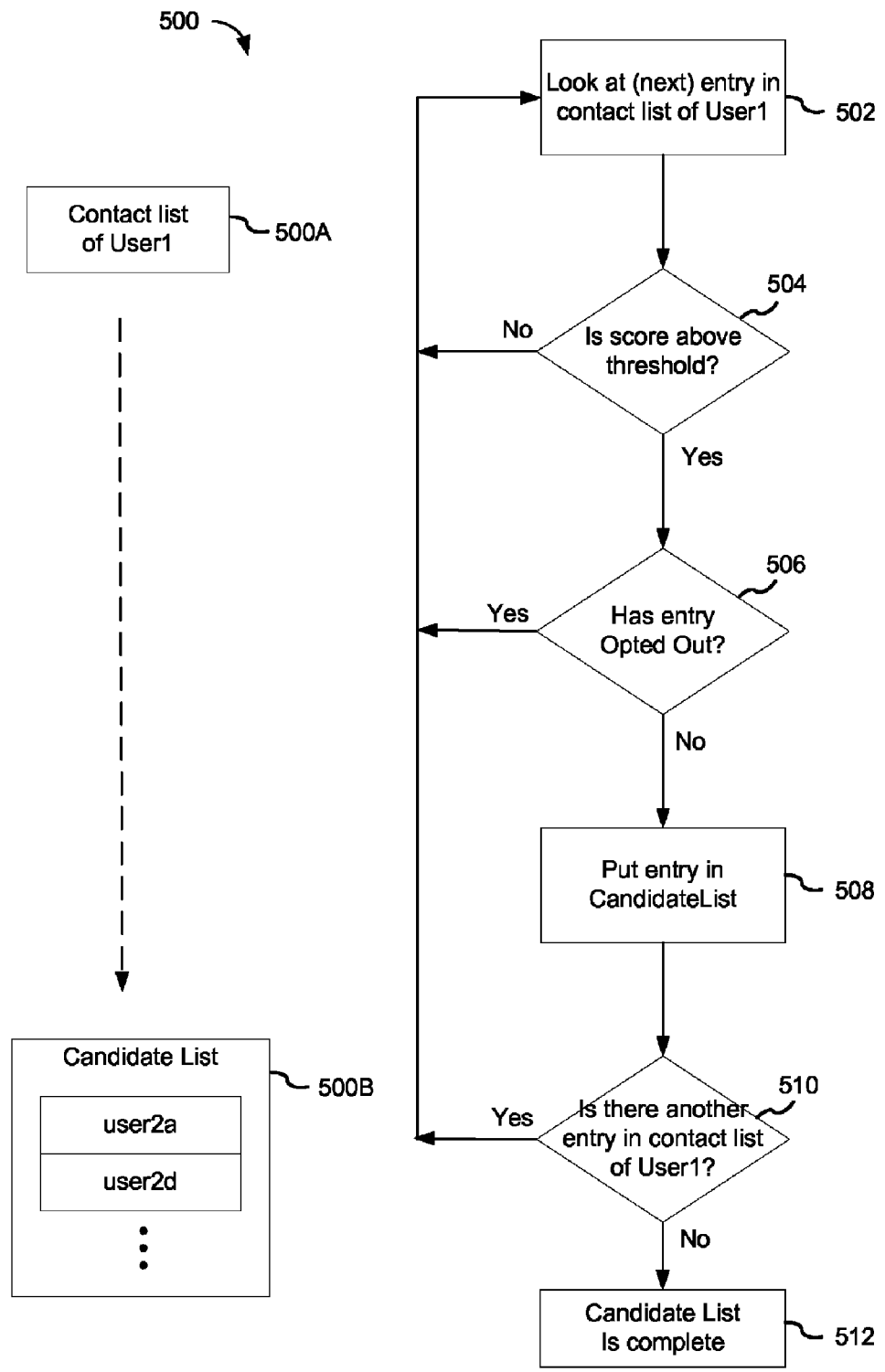
FIG. 5A is a flow diagram illustrating a process for creating a Candidate Pair List from a contact list of a user, according to some embodiments.
Figure 5B:
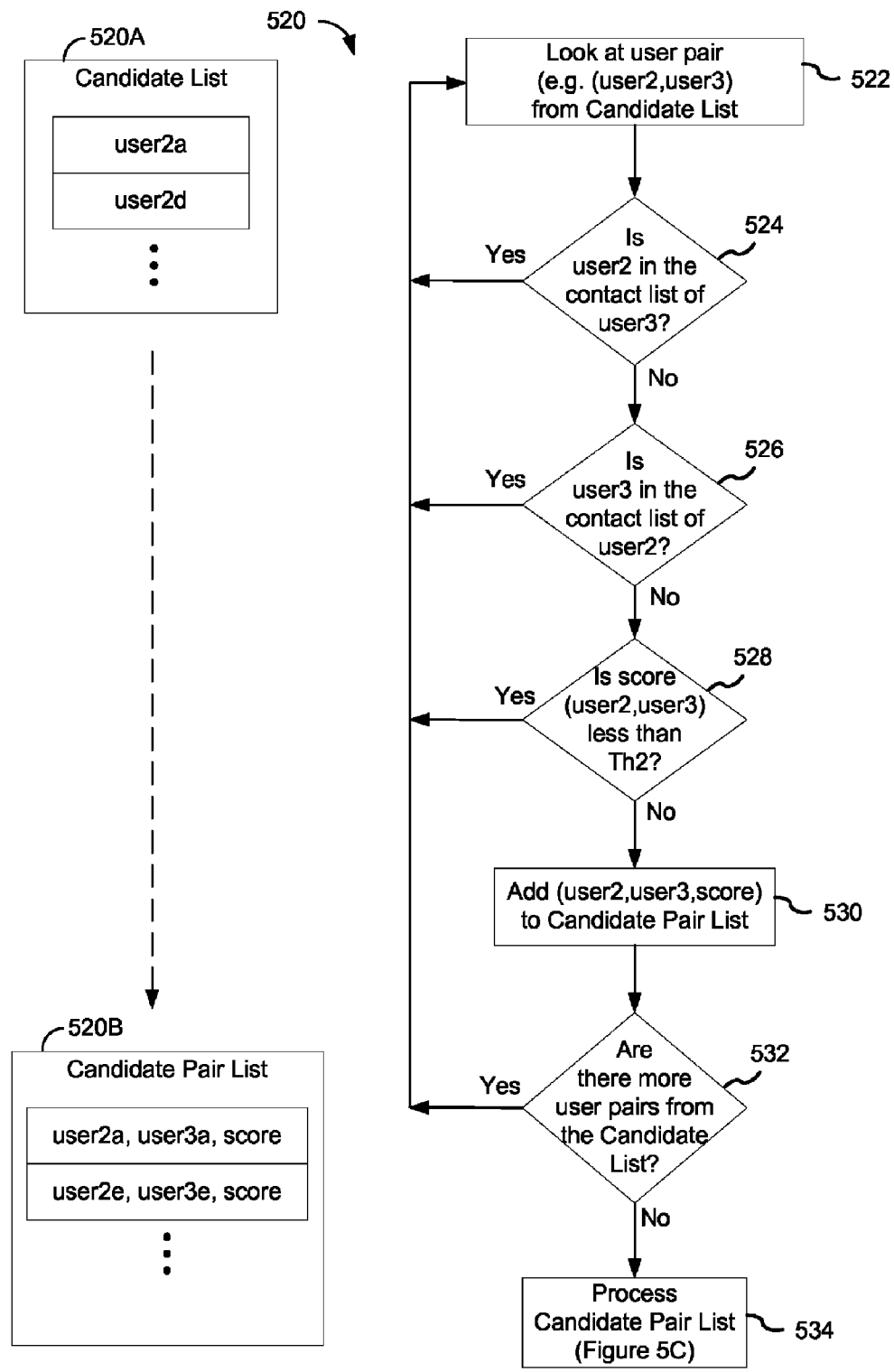
FIG. 5B is a flow diagram illustrating a process for creating a Candidate Pair List, according to some embodiments.
Figure 5C:
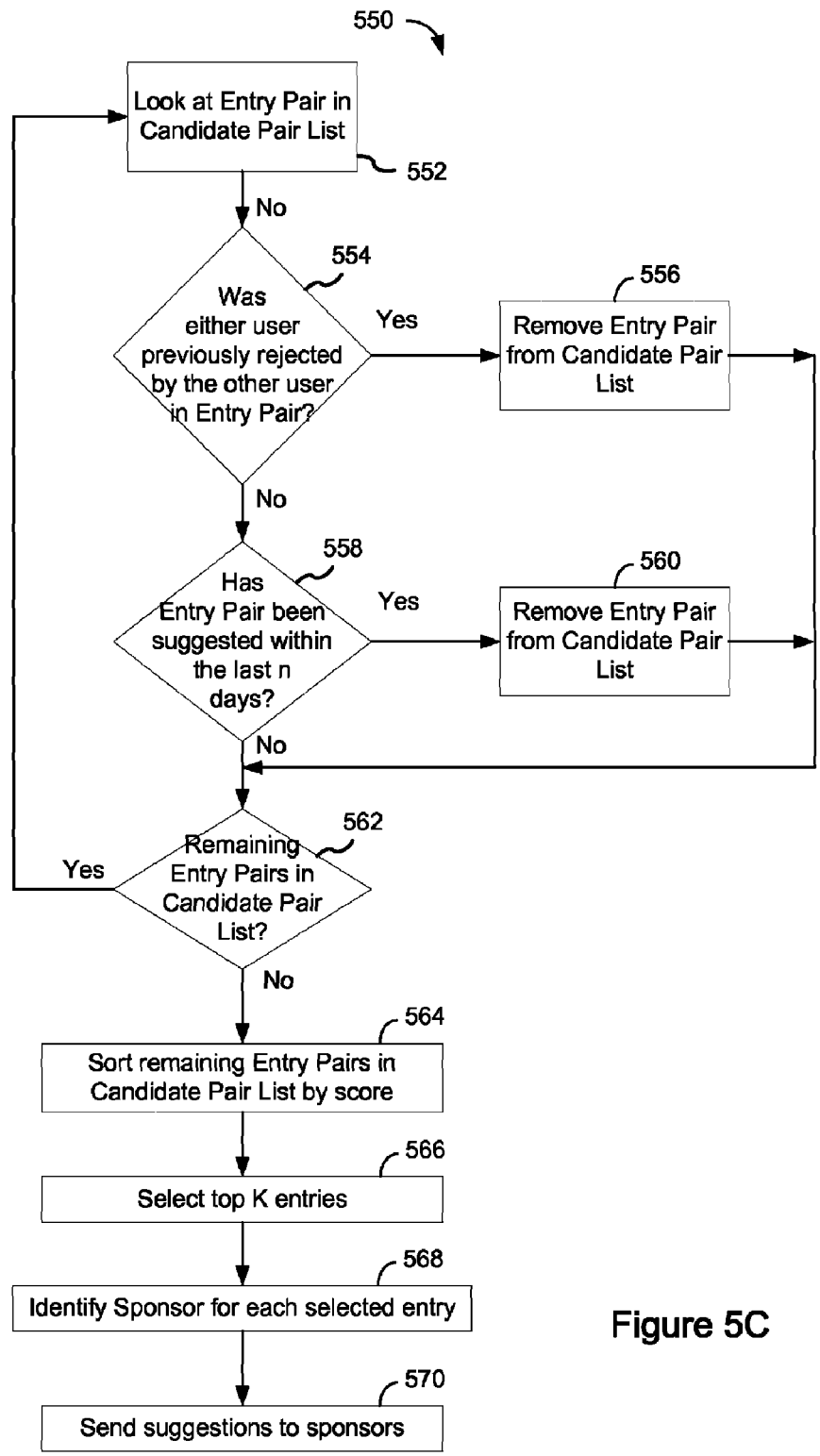
FIG. 5C is a flow diagram illustrating a process for cleaning up a Candidate Pair List and sending and suggestion to a user, according to some embodiments.

FIGS. 5A, 5B and 5C depict a first embodiment (or set of embodiments) for identifying pairs of users who are candidates for receiving an introduction, and for identifying a sponsor for each such pair of users. This embodiment first identifies users for potentially introducing to a first user (user1), and then identifies a sponsor for potentially sending each such introduction. FIG. 5A is a flow diagram illustrating a process 500 for creating a Candidate Pair List from a contact list of a user, according to some embodiments. The contact list of user1 500A is examined. At the beginning of process 500A, the first entry in the contact list is examined (502). A determination is made as to whether the score of the entry is above a threshold (504). The score (e.g., score 1010, FIG. 10A) for each entry in a user's contact list is determined based on one or metrics concerning the frequency, quality and/or timing (e.g., how recent) of the communications between the user and the person (e.g., another user of the same online service) associated with the entry. For example, in some embodiments, the score increases with increased number of communications between the users. In some embodiments, recent communications contribute more to the score than older communications. An example of such a scoring function is:

$$\text{score(user2)} = \sum_{\text{messages to/from user2}} \frac{1}{\text{age of message}},$$

where the "age of message" has a predefined positive minimum value, such as 1, and is measured in predefined units, such days or weeks. Alternately, the score of each user may be incremented by a fixed amount (e.g., 1) for each new communication, and decreased by a predefined amount (e.g., multiplying the score by a factor of 0.9 or the like) at fixed time intervals (e.g., once per day, week or other appropriate interval), so as to give older communications less weight in the score than newer communications. In some embodiments, other metrics associated with the communications may also be taken into account when computing the score for a respective entry.

If the score is not above the threshold (504—No), the next entry is examined. If the score is above the threshold (504—Yes), a determination is made as to whether the entry has opted out of participating in this process (506). If the entry has opted out (506—Yes), the next entry is examined. If the entry has not opted out (506—No), the entry is put in the Candidate List (508). If there is another entry in the contact list (510—Yes), the next entry is examined (502). If there are no other entries in the contact list (510—No), the Candidate List 500B is complete (512). Each entry in the contact list is examined and the aforementioned determinations are made until there are no more entries in the contact list.

FIG. 5B is a flow diagram illustrating a process 520 for creating a Candidate Pair List, according to some embodiments. Candidate List 520A is examined. At the beginning of process 520, a first pair of users from the Candidate List is examined (522). For example, user2 and user3 are examined as a pair. If user2 is already in the contact list of user3 (524—Yes) or user3 is already in the contact list of user2 (526—Yes), there is no need introduce user2 and user3 to each other, and therefore the process continues by examining a next user pair (522). If user2 is not in the contact list of user3 (524—No) and user3 is not in the contact list of user2 (526—No), a determination is made as to whether the score of the user pair is less than a threshold (528). In some embodiments, the score of a user pair (user2, user3) is based, at least in part, on the number of other users who have both user2 and user3 in their contact list. These other users may be called "common friends" or "potential sponsors." In some embodiments, the contribution to the user pair score by each common friend is based, at least in part, by a predefined combination of the contact list entry scores for the user2 and user3 entries in the contact list of the common friend. For example:

$$\text{score(user2, user3)} = \sum_{\text{common friends}} \text{function(score(user2), score(user3))},$$

where score (user2) and score (user3) are the scores for user2 and user3 in the contact list of a respective common friend. In one embodiment, the function for combining these score is a multiplication function that multiplies the two scores. In other embodiments, other functions may be used. For example, the function for computing the score for the pair (user2, user3) may also take into account the user2 and user3 scores for each common friend. Furthermore, in some embodiments the function for computing the score for the pair (user2, user3) may be a non-linear function.

If the score is less than the threshold (528—Yes), the next user pair is examined (522). If the score of the user pair is not less than the threshold (528—No), the user pair and the score are added to a Candidate Pair List (530). If there are any more pairs of users from the Candidate List that have not been examined (532—Yes), the next user pair is examined (522). If there are no more user pairs to be examined (532—No), the Candidate Pair List is processed (534), the details of which are explained below in the description for FIG. 5C.

FIG. 5C is a flow diagram illustrating a process 550 for cleaning up a Candidate Pair List and sending a suggestion to a user, according to some embodiments. At the beginning of process 552, the first Entry Pair in the Candidate Pair List is examined (552). An inquiry is made as to whether either user in the Entry Pair was previously rejected by the other user (554). If either user in the Entry Pair was previously rejected by the other user (554—Yes), the Entry Pair is removed from the Candidate Pair List (556) and the next Entry Pair (if any, 562) is examined (552). Alternately, operation 554 determines whether either user in the Entry Pair was previously rejected by the other user within a predefined period of time, such as M days or W weeks. If the either user has not been previously rejected by the other user (554—No), an inquiry is made as to whether the Entry Pair has been previously suggested within a predetermined amount of time (558). If the Entry Pair has already been suggested within the predetermined amount of time (558—Yes), the Entry Pair is removed from the Candidate Pair List (560) and the next Entry Pair (if any, 562) is examined (552). In some embodiments, the predetermined amount of time may be a predetermined number of days or months. If the Entry Pair has not already been suggested within the predetermined amount of time (558—No), and if there are remaining unexamined Entry Pairs in the Candidate Pair List (562—Yes), the next Entry Pair in the Candidate Pair List is examined (552). If there are no more unexamined Entry Pairs in the Candidate Pair List, the remaining Entry Pairs are sorted by score (564). The top K entries (each entry representing or indicating a pair of users) are selected (566) and a sponsor is identified for each selected entry (568). The sponsor of an Entry Pair must have both users from the Entry Pair in its contact list. In some embodiments, the identified sponsor for an Entry Pair must be a user who is authorized to receive the online status information for both users in the Entry Pair.

In some embodiments, the identified sponsor for an Entry Pair is selected, from among a set of potential sponsors, on the basis of the product of the contact scores for the two users (from the Entry Pair) in the contact list of the sponsor. For example, the potential sponsor with the highest product of the two contact scores may be selected as the sponsor for the Entry Pair. Suggestions are then sent to the identified sponsors (570).

Figure 6A:
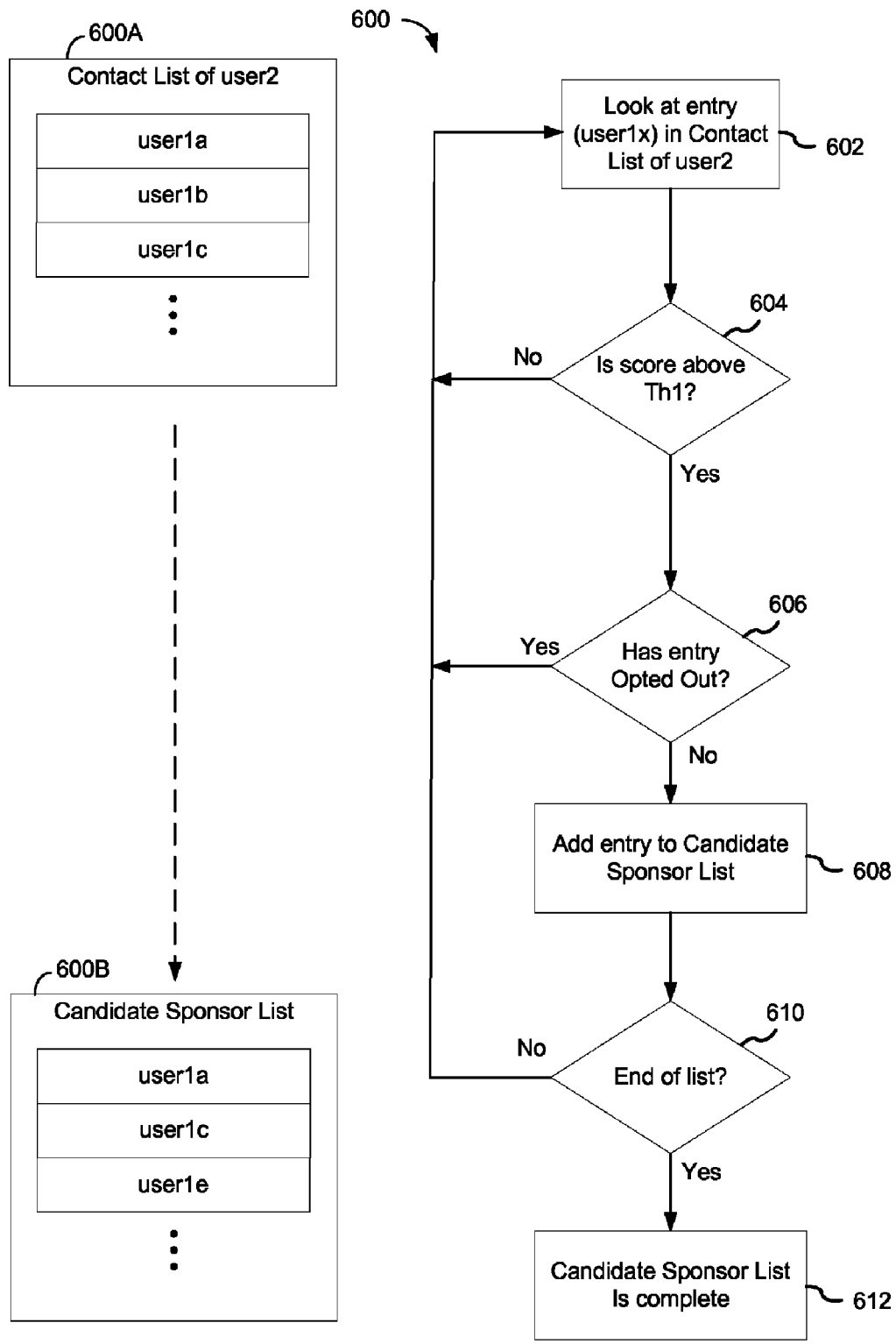
FIG. 6A is a flow diagram illustrating a process for creating a Candidate Sponsor List from the contact list of a user, according to some embodiments.
Figure 6B:
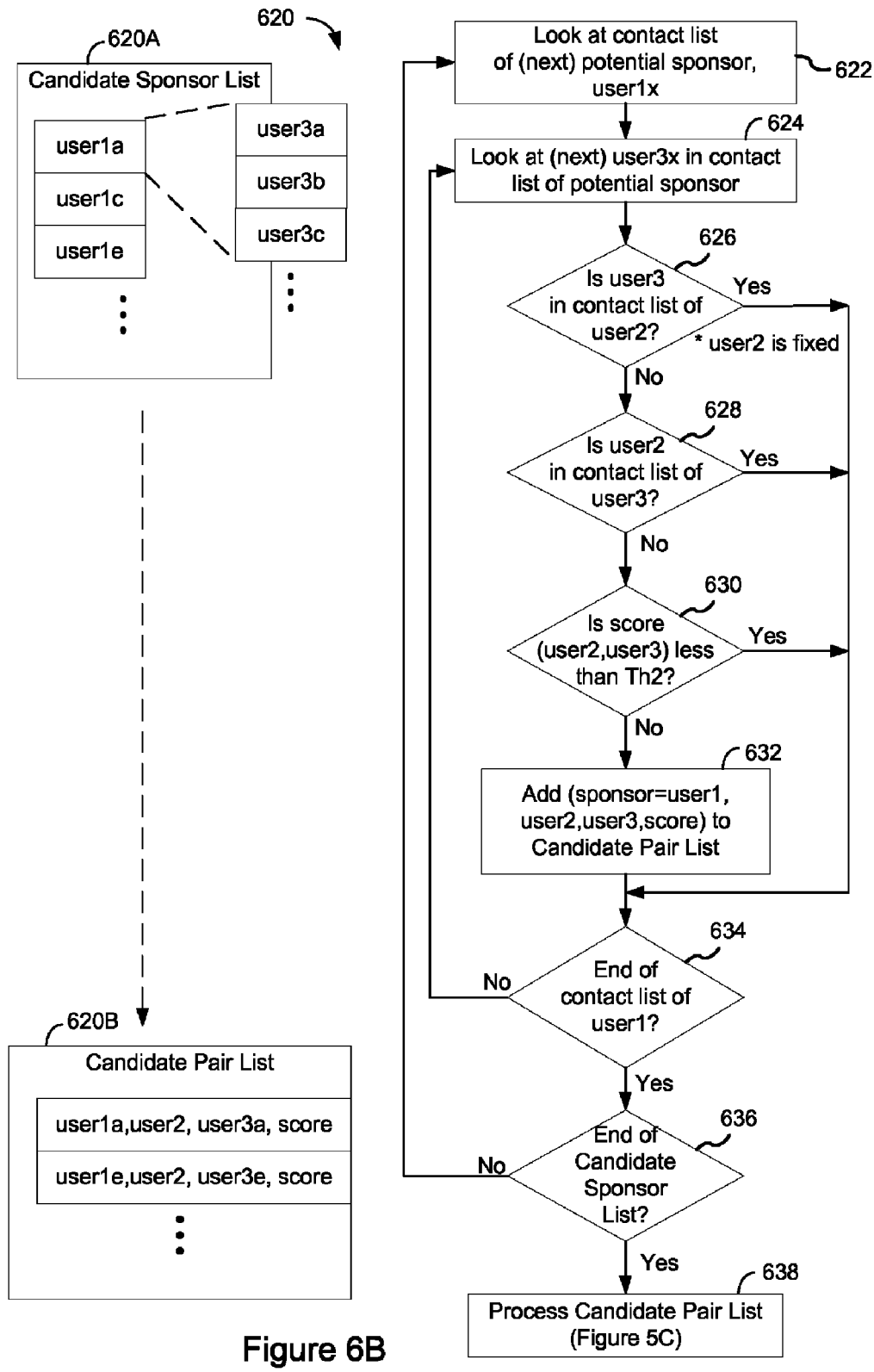
FIG. 6B is a flow diagram illustrating a process for creating a Candidate Pair List, according to some embodiments.

FIGS. 6A and 6B depict a second embodiment (or set of embodiments) for identifying pairs of users who are candidates for receiving an introduction, and for identifying a sponsor for each such pair of users. This embodiment first identifies potential sponsors for introducing other users to a respective user (user2), and then identifies other users who these sponsors could potentially introduce to the respective user. FIG. 6A is a flow diagram illustrating a process 600 for creating a Candidate Sponsor List 600B from the contact list 600A of a respective user (user2), according to some embodiments. At the beginning of process 600, the first entry in the contact list is examined (602). An inquiry is made as to whether the score of the entry is above a threshold (604). As described above, the score of an entry in a user's contact list may be based on one or more metrics concerning the frequency, quality and/or timing (e.g., how recent) of the communications between the user and the person (e.g., another user of the same online service) associated with the entry.

If the score is not above the threshold (604—No), the next entry in the contact list is examined (602). If the score is above the threshold (604—Yes), an inquiry is made as to whether the entry has opted out of participating in the process (606). If the entry has opted out (606—Yes), the next entry in the contact list is examined (602). If the entry had not opted out (606—No), the entry is added to the Candidate Sponsor List (608). Optionally, the contact list of the candidate sponsor (i.e., of the entry) is checked to see if the respective user (user2) is on the contact list of the candidate sponsor, and if not, the entry is not added to the Candidate Sponsor List (608). If the end of the list has not yet been reached (610—No), the next entry in the contact list is examined. If the end of the list has been reached the Candidate Sponsor List is completed (612).

FIG. 6B is a flow diagram illustrating a process 620 for creating a Candidate Pair List 620B, according to some embodiments. The contact list of a potential sponsor is identified and examined (622). In the beginning of process 620, the first user (e.g. user3a) in the contact list of the potential sponsor is examined (624). For example, Candidate Sponsor List 620A includes various potential sponsors (user1a, user1c, user1e, etc.). Each potential sponsor has an associated contact list. For example, the contact list of user1 a (within Candidate Sponsor List 620A) includes user3a, user3b, user3c, and so forth. Optionally, before performing any of the additional operations shown in FIG. 6B, the contact list of the potential sponsor is checked to ensure that user2 is on the contact list of the potential sponsor, and if not, the process 620 proceeds to select a next potential sponsor (622), if any. However, in some embodiments, user2 will be on the contact lists of all potential sponsors, because the process for forming the list of potential sponsors ensures that this is so. An inquiry is made as to whether user3 and user2 are in each other's contact list (626, 628). If user 3 is in the contact list of user2 (626—Yes), or user2 is in the contact list of user3 (628—Yes), there is no need introduce user2 and user3 to each other, and therefore the process continues by examining the next user (if any, 634) in the contact list of the potential sponsor (624). If user3 is not in the contact list of user2 (626—No), and user2 is not in the contact list of user3 (628—No), an inquiry is made as to whether the score of the user pair (user2, user3) is less than a predetermined threshold (630). As noted above, in some embodiments, the score of a user pair (user2, user3) is based, at least in part, on the number of other users who have both user2 and user3 in their contact list.

If the score is less than the threshold (630—Yes), the next user (if any, 634) in the contact list of the potential sponsor is examined (624). If the score is not less than the threshold (630—No), the sponsor information (sponsor=user1, user2, user3, score) is added to the Candidate Pair List (632). The contact list is re-examined to determine whether there is another unexamined contact in the contact list of the potential sponsor (634). If there is another contact (634—No), the contact is examined and the previously mentioned inquiries and determinations are made. If there are no more unexamined contacts (634—Yes), an inquiry is made as to whether the end of the Candidate Sponsor List has been reached (636). If there are more names in the Candidate Sponsor List (636—No), the contact list of the next potential sponsor is examined (622). If there are no more names in the Candidate Sponsor List (636—Yes), the Candidate Pair List is processed, as shown and described above in the description for FIG. 5C. However, in this embodiment, operation 568 (identify a sponsor for each selected Entry Pair) is either not needed or optional, because in this embodiment the sponsor for each Entry Pair has already been selected.

Figure 7A:
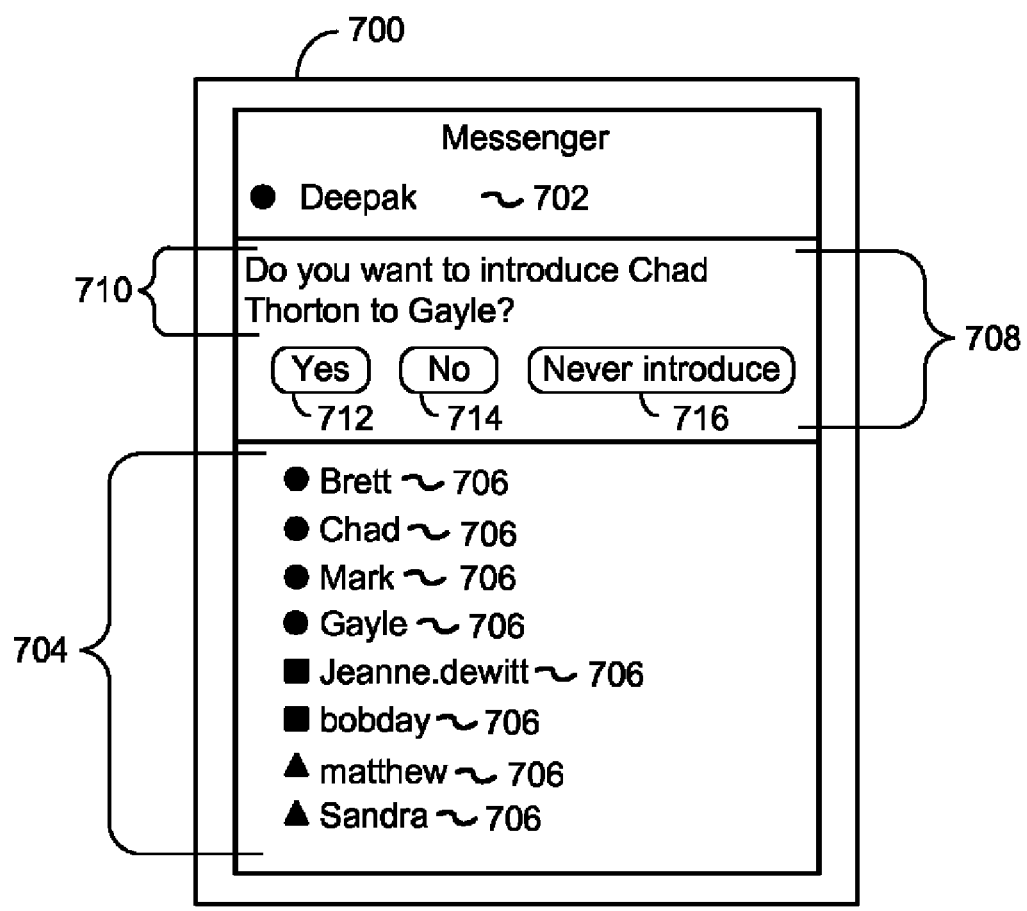
FIG. 7A-7D are schematic screenshots of a messaging application with request messages, according to some embodiments of the invention.

FIGS. 7A-7D are schematic screenshots of a messaging application with request messages, according to some embodiments of the invention. FIG. 7A is a schematic screenshot of a messaging application 700 of selected sponsor "Deepak." The messaging application includes a messenger application user identifier 702, and a contact display field 704 containing contacts 706. The messenger application displays an introduction message 708 that includes an introduction inquiry 710, "Yes" button 712, "No" button 714, and optionally a "Never introduce" button 716. In this example, user "Deepak" has been selected as a sponsor to introduce two contacts in his contact list to each other, and therefore, the introduction message appears on his messaging application. Here, Deepak is being asked whether he would like to introduce Chad to Gayle. In some embodiments, if Deepak accepts the introduction inquiry by selecting the "Yes" button 712, a message will be sent to Chad. In other embodiments, if Deepak accepts the introduction inquiry by selecting the "Yes" button 712, a message will be sent to Gayle. For example, in some embodiments the introduction message is sent to the user (Chad or Gayle) whose entry in Deepak's contact list has the higher score. In yet other embodiments, the message may be sent to both Chad and Gayle.

Figure 7B:
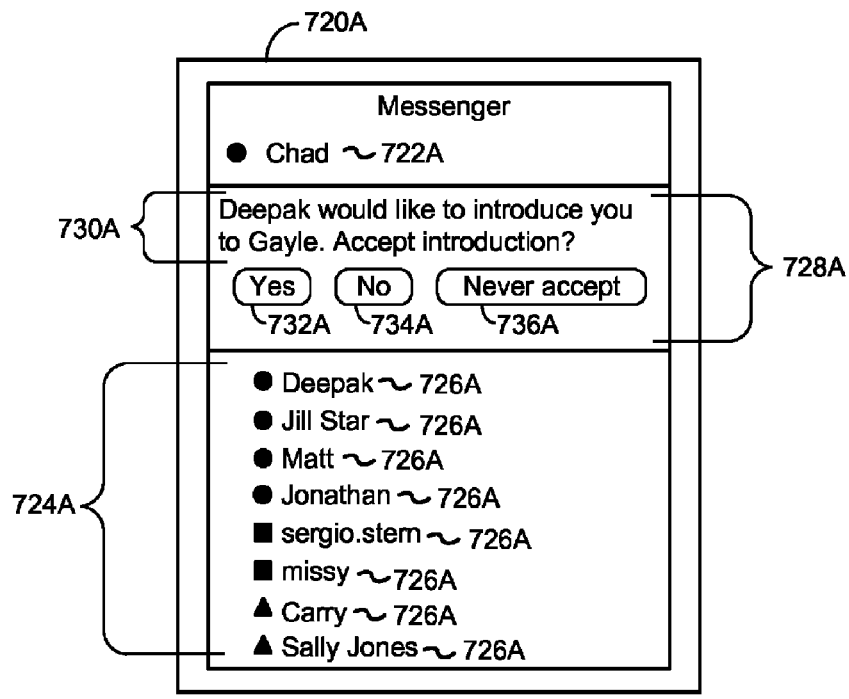
Figure 7C:
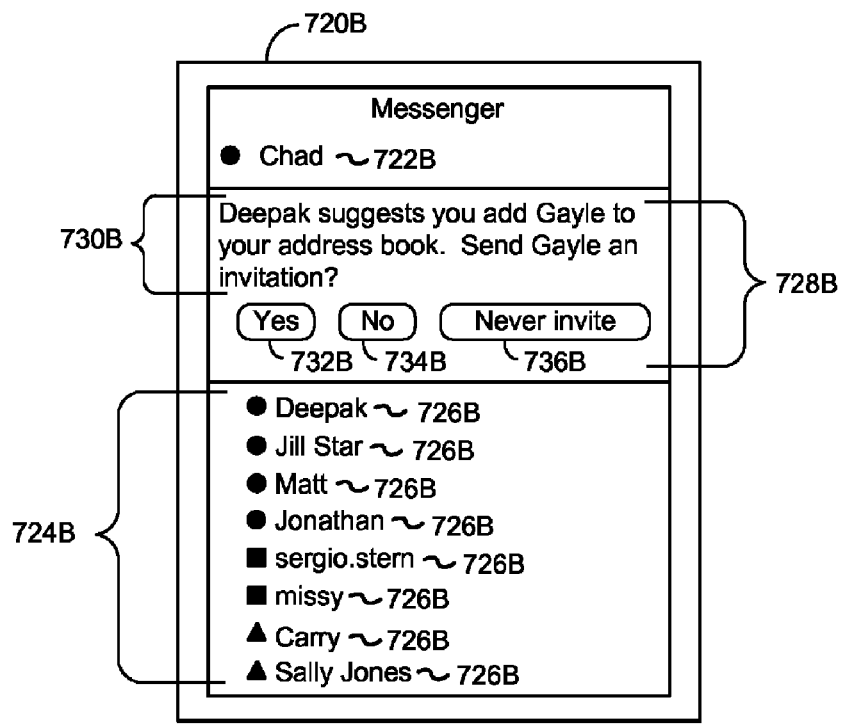

FIGS. 7B and 7C are schematic screenshots of a messaging application 720A of candidate "Chad." Similar to the previously described messaging application, the messaging application 720A includes a messenger application user identifier 722A, a contact display field 724A containing contacts 726A. The messenger application displays an introduction suggestion message 728A that includes an introduction suggestion inquiry 730A, "Yes" button 732A, "No" button 734A, and optionally a "Never accept" button 736A. The introduction suggestion message 728A has been sent to Chad's messaging application as a result of user Deepak accepting the introduction inquiry (as shown in FIG. 7A).

In some embodiments, as shown in FIG. 7C, the introduction suggestion inquiry 728B may include and alternative introduction suggestion inquiry 730B ("Deepak suggests you add Gayle to your address book. Send Gayle an invitation?"). It should be appreciated that the inquires shown in these Figures are merely exemplary. Additional and/or alternative inquiries may also be displayed.

Figure 7D:
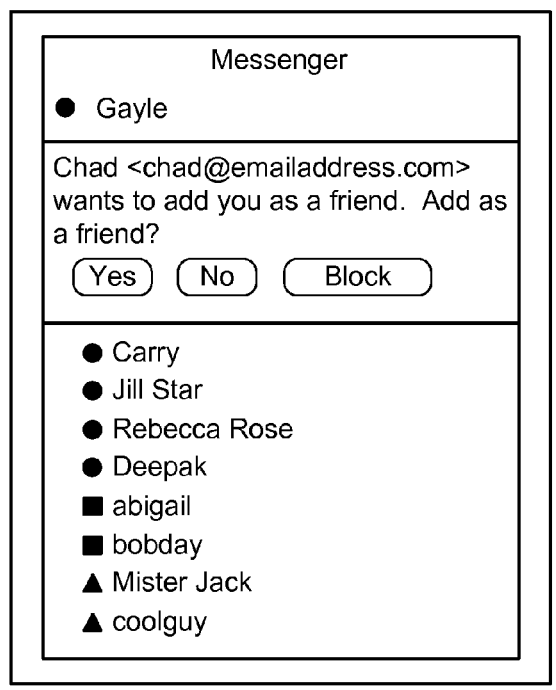

If Chad selects "Yes" button 732B (FIG. 7C), Gayle would receive a invitation message such as the one shown in FIG. 7D and would therefore have the option to accept, reject or block Chad as a friend in her contact list. Thus, in the embodiment depicted in FIGS. 7C and 7D, not only Chad must accept the introduction from the sponsor (Deepak), but Gayle must also accept the invitation from Chad to add Chad as a friend to her contact list in order for the system to update the address books of Chad and Gayle so as to enable Chad and Gayle to receive each other's online status information.

Figure 8:
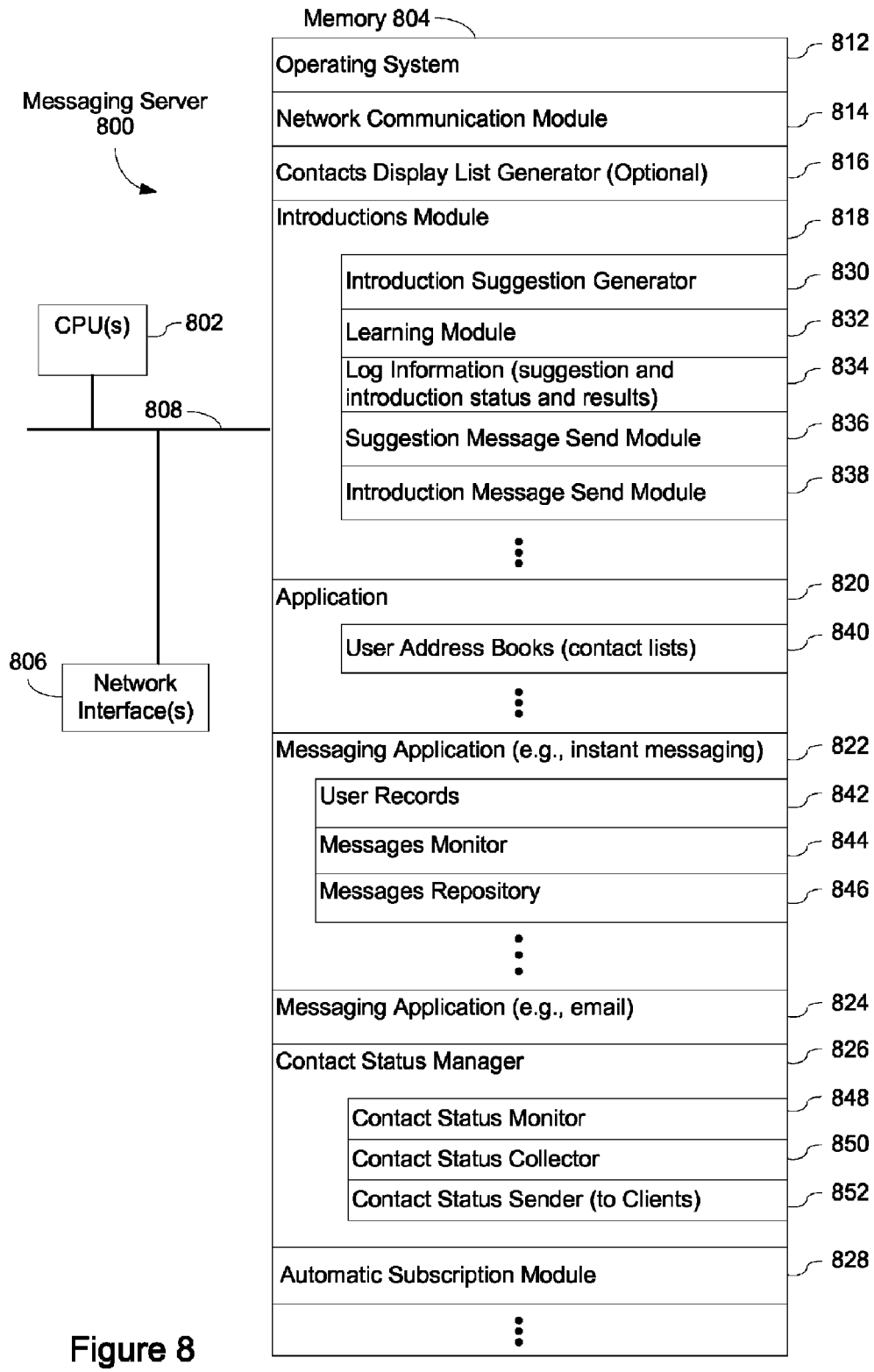
FIG. 8 is a block diagram illustrating a messaging server, according to some embodiments of the invention.

FIG. 8 is a block diagram illustrating a messaging server, according to some embodiments of the invention. The messaging server 800 typically includes one or more processing units (CPU's) 802, one or more network or other communications interfaces 806, memory 804, and one or more communication buses 808 for interconnecting these components. The communication buses 808 may include circuitry (sometimes called a chipset) that interconnects and controls communications between system components. The messaging server 800 optionally may include a user interface (not shown), which may include a display device, a keyboard, and/or a mouse. Memory 804 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 804 may optionally include one or more storage devices remotely located from the CPU(s) 802. In some embodiments, memory 804 stores the following programs, modules and data structures, or a subset thereof:

- an operating system 812 that includes procedures for handling various basic system services and for performing hardware dependent tasks;
- a network communication module 814 that is used for connecting the messaging server 800 to other computers via the one or more communication network interfaces 806 (wired or wireless) and one or more communication networks, such as the Internet, other wide area networks, local area networks, metropolitan area networks, and so on;
- an optional list generator 816 for generating lists of contacts;
- an introductions module 818;
- one or more applications 820;
- one or more messaging applications, such as an instant messaging application 822 or an email application 824;
- a contact status manager 826 for managing the statuses of users; and
- an automatic subscriptions module 828.

The introductions module 818 may include an introduction suggestion generator 830, a learning module 832, log information 834, a suggestion message send module 836, and an introduction message send module 838. The log information 834 may include information related to suggestions and introduction status and results. An example of log information is shown in FIG. 4, discussed above. Examples of the suggestion generator 830 were discussed above with reference to FIGS. 5A-5C and 6A-6B. Examples of the suggestion message send module 836 and introduction send module 838 were discussed above with reference to FIGS. 2, 5C, and 7A-7D.

The application 820 may include user address books 840, also known as contact lists.

The messaging application 822 may include user records 842, a message monitor 844 for monitoring message traffic to and from the messaging server 800, and a messages repository 846 for storing messages sent and received by clients. The user records 842 include status information and address books of users. In some embodiments, a messaging application may include a calendar application, and interactions between a user and other contacts may include appointments or other calendar events that reference the user's contacts.

The contact status manager 826 includes a contact status monitor 848, a contact status collector 850, and a contact status sender 852. As discussed above with reference to FIG. 1C, the contact status monitor 848 receives and processes messages announcing status changes and updates status of users. The contact status collector 850 gathers status information for contacts in a user's address book from other messaging servers. The contact status sender 852 sends the status information of contacts in a user's address book to the client associated with the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 804 may store a subset of the modules and data structures identified above. Furthermore, memory 804 may store additional modules and data structures not described above.

Although FIG. 8 shows a "messaging server," FIG. 8 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 8 could be implemented on single servers and single items (or combinations of items) in FIG. 8 could be implemented by one or more servers. The actual number of servers used to implement a messaging server and how features are allocated among them will vary from one implementation to another, and may depend in part on the amount of data traffic that the system must handle during peak usage periods as well as during average usage periods.

Figure 9:
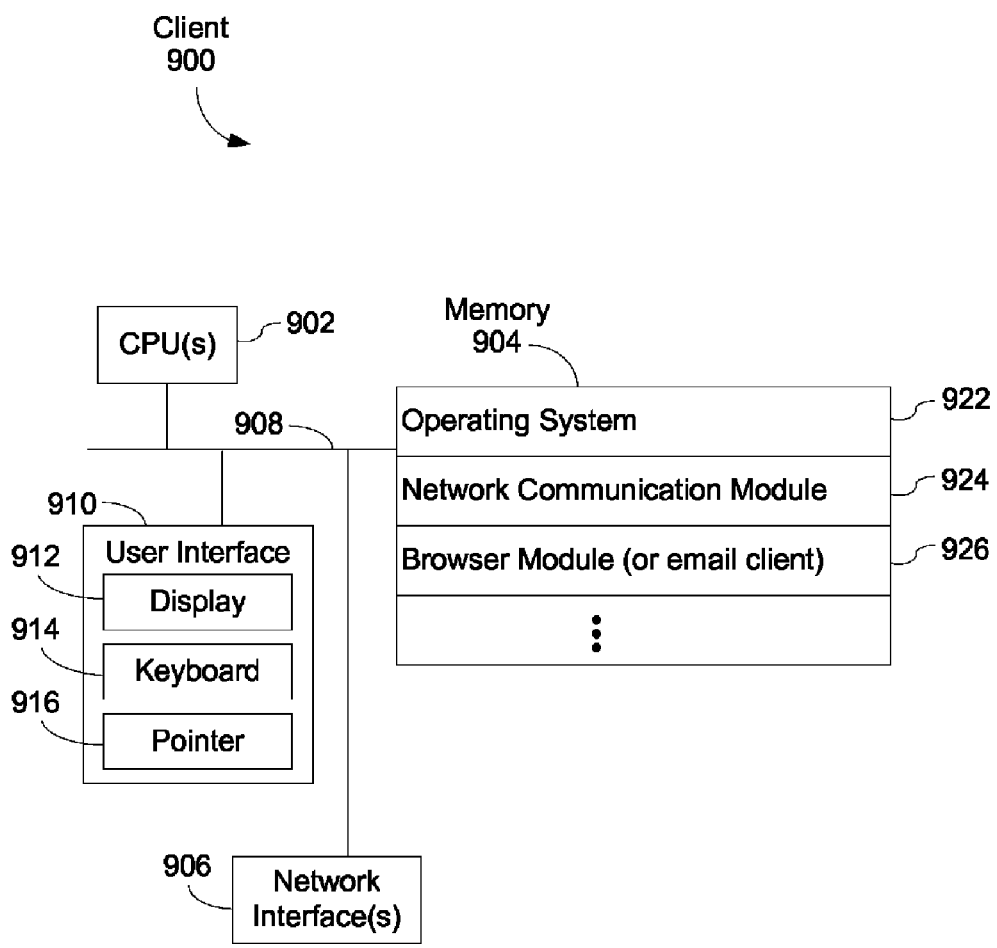
FIG. 9 is a block diagram illustrating a client, according to some embodiments of the invention.

FIG. 9 is a block diagram illustrating a client, according to some embodiments of the invention. The client 900 typically includes one or more processing units (CPU's) 902, one or more network or other communications interfaces 906, memory 904, and one or more communication buses 908 for interconnecting these components. The communication buses 908 may include circuitry (sometimes called a chipset) that interconnects and controls communications between system components. The client 900 also includes a user interface 910, which may include a display device 912, a keyboard 914, and/or a pointer (or mouse) 916. Memory 904 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 904 may optionally include one or more storage devices remotely located from the CPU(s) 902. Memory 904, or alternately the non-volatile memory device (s) within memory 904, comprises a computer readable storage medium. In some embodiments, memory 904 stores the following programs, modules and data structures, or a subset thereof:

- an operating system 922 that includes procedures for handling various basic system services and for performing hardware dependent tasks;
- a network communication module 924 that is used for connecting the client 900 to other computers (e.g., one or more of the message servers 800) via the one or more communication network interfaces 906 (wired or wireless) and one or more communication networks, such as the Internet, other wide area networks, local area networks, metropolitan area networks, and so on; and
- a browser application (or email client) 926.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 904 may store a subset of the modules and data structures identified above. Furthermore, memory 904 may store additional modules and data structures not described above.

Although FIG. 9 shows a "client," FIG. 9 is intended more as functional description of the various features which may be present in a client than as a structural schematic of the embodiments described herein. In practice, and as recognized by those of ordinary skill in the art, items shown separately could be combined and some items could be separated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of introducing users of a service, performed by a server system having one or more processors and memory storing one or more programs for execution by the one or more processors, the method comprising:
    at the server system:
    identifying, among contacts of a first user in a contact list of the first user, second and third users who are not in each other's contact lists and who satisfy predefined selection criteria with respect to two or more shared contacts, wherein the two or more shared contacts comprise the first user and one or more additional users identified in contact lists of both the second and third users and the predefined selection criteria is based, at least in part, on:
        a count of users who have both the second and third users in their contact lists; and
        a predefined combination of contact list entry scores for the second and third users, wherein a respective contact list entry score for the second user is determined, at least in part, based on two or more of: quantity, quality, and timing of communications between the second user and a respective shared contact of the two or more shared contacts; and a respective contact list entry score for the third user is determined, at least in part, based on two or more of: quantity, quality, and timing of communications between the third user and the respective shared contact;
    sending a server-generated suggestion to the first user of the service, suggesting an introduction of the second user to the third user of the service;
    receiving from the first user a response to the suggestion; and
    upon receiving a positive response to the suggestion from the first user, sending the introduction to at least one of the second and third users.

2. The method of claim 1, including maintaining as private the contact list of each user, and sending the introduction only with explicit permission of the first user.

3. The method of claim 1, wherein the second and third users are authorized to receive online status information of the first user and the online status information of the first user indicates the first user's availability to exchange messages with other users.

4. The method of claim 1, including conveying online status information of the first user to the second and third users, and conveying online status information of the second and third users to the first user, wherein the online status information of the first user indicates the first user's availability to exchange messages with other users, the online status information of the second user indicates the second user's availability to exchange messages with other users, and the online status information of the third user indicates the third user's availability to exchange messages with other users.

5. The method of claim 1, including comparing contact metrics of the second and third users with respect to the first user to select one of the second and third users as the recipient of the introduction, and sending the introduction to the selected one of the second and third users.

6. The method of claim 1, including asking the first user to select one of the second and third users as the recipient of the introduction.

7. The method of claim 1, including sending the introduction to the third user, and determining whether the third user accepts the introduction, and if the third user accepts the introduction, sending an invitation to the second user, and if the second user accepts the invitation, authorizing the second and third users to receive online status information of each other.

8. The method of claim 1, wherein the contact lists of the first, second and third users comprise subsets of address books of the first, second and third users.

9. The method of claim 1, wherein the contact list of the first user comprises a subset of users identified in the address books of the first user, wherein the subset comprises users authorized to receive online status information of the first user and the online status information of the first user indicates the first user's availability to exchange messages with other users.

10. A computer-implemented method of identifying pairs of users to introduce, performed by a server system having one or more processors and memory storing one or more programs for execution by the one or more processors, the method comprising:
    at the server system:
    accessing contact lists of multiple users of a service;
    identifying, from the accessed contact lists, pairs of users who are not in each other's contact lists but who have common contacts in their contact lists, each identified pair of users having respective first and second users;

generating a user pair score for each identified pair of users, wherein the user pair score is determined at least in part on a predefined combination of contact list entry scores for the first and second users, wherein a respective contact list entry score for the first user is determined, at least in part, based on two or more of: quantity, quality, and timing of communications between the first user and a respective common contact of the identified pair of users; and a respective contact list entry score for the second user is determined, at least in part, based on two or more of: quantity, quality, and timing of communications between the second user and the respective common contact;

selecting a subset of the identified pairs of users in accordance with predefined selection criteria, wherein the predefined selection criteria is based, at least in part, on the user pair scores of the identified pairs of users;

after selecting the subset of the identified pairs of users, identifying a potential sponsor for each pair of users in the selected subset, wherein the potential sponsor is a user of the service distinct from the first and second users;

with respect to a pair of users in the selected subset, sending a server-generated suggestion to the potential sponsor, suggesting an introduction of the respective first and second users of the pair of users; and upon receiving a positive response to the suggestion from the potential sponsor, sending the introduction to at least one of the first and second users of the pair of users.

11. The method of claim 10, including maintaining as private the contact list of each user, and sending the introduction only with explicit permission of the potential sponsor.

12. The method of claim 10, wherein the first and second users are authorized to receive online status information of the potential sponsor and the online status information of the potential sponsor indicates the potential sponsor's availability to exchange messages with other users.

13. The method of claim 10, including, prior to sending the suggestion to the potential sponsor, conveying online status information of the potential sponsor to the first and second users, and conveying online status information of the first and second users to the potential sponsor, wherein the online status information of the potential sponsor indicates the potential sponsor's availability to exchange messages with other users, the online status information of the first user indicates the first user's availability to exchange messages with other users, and the online status information of the second user indicates the second user's availability to exchange messages with other users.

14. The method of claim 10, including comparing contact metrics of the first and second users with respect to the potential sponsor to select one of the first and second users as the recipient of the introduction, and sending the introduction to the selected one of the first and second users.

15. The method of claim 10, including asking the potential sponsor to select one of the first and second users as the recipient of the introduction.

16. The method of claim 10, including determining whether the user to whom the introduction is sent accepts the introduction, and if that user accepts the introduction, sending an invitation to the other user, and if the other user accepts the invitation, authorizing the first and second users to receive online status information of each other.

17. The method of claim 10, wherein the contact lists of the first and second users and the potential sponsor comprise subsets of address books of the first and second users and the potential sponsor.

18. The method of claim 10, wherein the contact list of the first user comprises a subset of users identified in the address books of the first user, wherein the subset comprises users authorized to receive online status information of the first user and the online status information of the first user indicates the first user's availability to exchange messages with other users.

19. The method of claim 10, wherein the user pair score for the identified pair of users is determined, at least in part, based on a count of users who have both the first and second users of the identified pair of users in their contact lists.

20. A computer system, comprising:

memory, the memory storing programs and data, including contact lists of multiple users of a service, and one or more programs;

one or more processors, wherein the one or more programs are executable by the one or more processors;

the one or more programs including instructions executable by the one or more processors, including:

instructions for identifying, among contacts of a first user in a contact list of the first user, second and third users who are not in each other's contact lists and who satisfy predefined selection criteria with respect to two or more shared contacts, wherein the two or more shared contacts comprise the first user and one or more additional users identified in the contact lists of both the second and third users and the predefined selection criteria is based, at least in part, on:

a count of users who have both the second and third users in their contact lists; and a predefined combination of contact list entry scores for the second and third users, wherein a respective contact list entry score for the second user is determined, at least in part, based on two or more of: quantity, quality, and timing of communications between the second user and a respective shared contact of the two or more shared contacts; and a respective contact list entry score for the third user is determined, at least in part, based on two or more of: quantity, quality, and timing of communications between the third user and the respective shared;

instructions for sending a server-generated suggestion to the first user of the service, suggesting an introduction of the second user to the third user of the service;

instructions for receiving from the first user a response to the suggestion; and instructions sending the introduction to at least one of the second and third users upon receiving a positive response to the suggestion from the first user.

21. A computer system, comprising:

memory, the memory storing programs and data, including contact lists of multiple users of a service, and one or more programs;

one or more processors, wherein the one or more programs are executable by the one or more processors;

the one or more programs including instructions executable by the one or more processors, including:

instructions for accessing contact lists of multiple users of a service;

instructions for identifying, from the accessed contact lists, pairs of users who are not in each other's contact lists but who have common contacts in their contact lists, each identified pair of users having respective first and second users;

instructions for generating a user pair score for each identified pair of users, wherein the score is determined at least in part a predefined combination of contact list entry scores for the first and second users, wherein a respective contact list entry score for the first user is determined, at least in part, based on two or more of: quantity, quality, and timing of communications between the first user and a respective common contact of the identified pair of users; and a respective contact list entry score for the second user is determined, at least in part, based on two or more of: quantity, quality, and timing of communications between the second user and the respective common contact;

instructions for selecting a subset of the identified pairs of users in accordance with predefined selection criteria, wherein the predefined selection criteria is based, at least in part, on the user pair scores of the identified pairs of users;

instructions, for execution after selecting the subset of the identified pairs of users, for identifying a potential sponsor for each pair of users in the selected subset, wherein the potential sponsor is a user of the service distinct from the first and second users;

instructions for sending a server-generated suggestion to the identified potential sponsor of a respective pair of users in the selected subset, suggesting an introduction of the respective first and second users of the pair of users; and instructions for receiving from the potential sponsor a response to the suggestion; and instructions for sending the introduction to at least one of the first and second users of the pair of users upon receiving from the potential sponsor a positive response to the suggestion.

22. The computer system of claim 21, wherein the user pair score for the identified pair of users is determined, at least in part, based on a count of users who have both the first and second users of the identified pair of users in their contact lists.

23. A non-transitory computer readable storage medium, storing one or more programs for execution by one or more processors of a computer system, the one or more programs including instructions for:

identifying, among contacts of a first user in a contact list of the first user, second and third users who are not in each other's contact lists and who satisfy predefined selection criteria with respect to two or more shared contacts, wherein the two or more shared contacts comprise the first user and one or more additional users identified in contact lists of both the second and third users and the predefined selection criteria is based, at least in part, on:
a count of users who have both the second and third users in their contact lists; and
a predefined combination of contact list entry scores for the second and third users, wherein a respective contact list entry score for the second user is determined, at least in part, based on two or more of: quantity, quality, and timing of communications between the second user and a respective shared contact of the two or more shared contacts; and a respective contact list entry score for the third user is determined, at least in part, based on two or more of: quantity, quality, and timing of communications between the third user and the respective shared contact;

sending a server-generated suggestion to the first user of the service, suggesting an introduction of the second user to the third user of the service;

receiving from the first user a response to the suggestion; and upon receiving a positive response to the suggestion from the first user, sending the introduction to at least one of the second and third users.

24. A non-transitory computer readable storage medium, storing one or more programs for execution by one or more processors of a computer system, the one or more programs including instructions for:

accessing contact lists of multiple users of a service;

identifying, from the accessed contact lists, pairs of users who are not in each other's contact lists but who have common contacts in their contact lists, each identified pair of users having respective first and second users;

generating a user pair score for each identified pair of users, wherein the score is determined at least in part on a redefined combination of contact list entry scores for the first and second users, wherein a respective contact list entry score for the first user is determined, at least in part, based on two or more of: quantity, quality, and timing of communications between the first user and a respective common contact of the identified pair of users; and a respective contact list entry score for the second user is determined, at least in part, based on two or more of: quantity, quality, and timing of communications between the second user and the respective common contact;

selecting a subset of the identified pairs of users in accordance with predefined selection criteria, wherein the predefined selection criteria is based, at least in part, on the user pair scores of the identified pairs of users;

after selecting the subset of the identified pairs of users, identifying a potential sponsor for each pair of users in the selected subset, wherein the potential sponsor is a user of the service distinct from the first and second users;

with respect to a pair of users in the selected subset, sending a server-generated suggestion to the potential sponsor, suggesting an introduction of the respective first and second users of the pair of users; and upon receiving a positive response to the suggestion from the potential sponsor, sending the introduction to at least one of the first and second users of the pair of users.

25. The non-transitory computer readable storage medium of claim 24, wherein the user pair score for the identified pair of users is determined, at least in part, based on a count of users who have both the first and second users of the identified pair of users in their contact lists.

* * * * *

UNITED STATES PATENT AND TRADEMARK OFFICE
CERTIFICATE OF CORRECTION

PATENT NO. : 8,407,311 B1
APPLICATION NO. : 12/050073
DATED : March 26, 2013
INVENTOR(S) : Behforooz et al.

Page 1 of 1

It is certified that error appears in the above-identified patent and that said Letters Patent is hereby corrected as shown below:

In the Claims

At column 20, line 25, please delete "redefined" and insert -- predefined --.

Signed and Sealed this
Twenty-eighth Day of May, 2013

Teresa Stanek Rea
*Acting Director of the United States Patent and Trademark Office*